United States Patent
Wilkinson

(10) Patent No.: US 12,321,804 B2
(45) Date of Patent: Jun. 3, 2025

(54) SYSTEMS AND METHODS FOR DETECTING AND TRACKING MISSING RFID TAGS

(71) Applicant: Bruce Walter Wilkinson, Rogers, AR (US)

(72) Inventor: Bruce Walter Wilkinson, Rogers, AR (US)

(*) Notice: Subject to any disclaimer, the term of this patent is extended or adjusted under 35 U.S.C. 154(b) by 0 days.

(21) Appl. No.: 18/754,554

(22) Filed: Jun. 26, 2024

(65) Prior Publication Data
US 2024/0346267 A1    Oct. 17, 2024

Related U.S. Application Data

(63) Continuation of application No. PCT/US2024/024218, filed on Apr. 12, 2024.
(Continued)

(51) Int. Cl.
*G06K 7/10* (2006.01)
*G06K 19/07* (2006.01)
(Continued)

(52) U.S. Cl.
CPC ..... *G06K 7/10099* (2013.01); *G06K 7/10297* (2013.01); *G06K 7/10356* (2013.01);
(Continued)

(58) Field of Classification Search
CPC ... G06K 7/10376; G06Q 10/087; G08B 13/24
(Continued)

(56) References Cited

U.S. PATENT DOCUMENTS 8,432,258 B2    4/2013    Wilkinson et al.
8,669,915 B2    3/2014    Wilkinson et al.
(Continued)

FOREIGN PATENT DOCUMENTS

EP    3729325 A1 *    10/2020    ......... G06K 19/0704
WO    2014146132 A2    9/2014

OTHER PUBLICATIONS

Leonard, "Patent Pending: Zebra's plan for managing large RFID populations", Supply Chain Dive, published Feb. 7, 2020, 7 pages.
(Continued)

*Primary Examiner* — Nam V Nguyen
(74) *Attorney, Agent, or Firm* — Thompson Coburn LLP

(57) ABSTRACT

Systems and methods for radio-frequency identification (RFID) are disclosed where session control tasks are off-loaded from an RFID reader to a separate device which can take the form of an RFID transmitter such as a session control broadcaster. Accordingly, the RFID transmitter transmits messages to RFID tags to control which of the tags within range of the RFID transmitter are in a readable state and/or unreadable state. These messages can take the form of session control messages, and these session control messages can be targeted to tags of interest, such as RFID tags that are deemed to be missing. By offloading the transmission of messages that control the readability of tags to a separate RFID transmitter, the system frees up the RFID reader to spend more time on inventory read operations, which reduces the risk that an RFID tag will stay hidden when it briefly exists in a hot spot.

27 Claims, 9 Drawing Sheets

Related U.S. Application Data

(60) Provisional application No. 63/458,999, filed on Apr. 13, 2023.

(51) Int. Cl.
*G06K 19/073* (2006.01)
*G06K 19/077* (2006.01)
*G06Q 10/087* (2023.01)

(52) U.S. Cl.
CPC ..... *G06K 7/10366* (2013.01); *G06K 7/10376* (2013.01); *G06K 7/10475* (2013.01); *G06K 19/0723* (2013.01); *G06K 19/07345* (2013.01); *G06K 19/07758* (2013.01); *G06Q 10/087* (2013.01)

(58) Field of Classification Search
USPC ................................................ 340/10.1–10.5
See application file for complete search history.

(56) References Cited

U.S. PATENT DOCUMENTS

| | | |
|---|---|---|
| 8,860,557 B2 | 10/2014 | Wilkinson |
| 8,878,649 B2 | 11/2014 | Wilkinson et al. |
| 9,053,615 B2 | 6/2015 | Jones et al. |
| 9,123,016 B2 | 9/2015 | Jones et al. |
| 9,135,481 B2 | 9/2015 | Wilkinson |
| 9,158,950 B2 | 10/2015 | Wilkinson |
| 9,230,145 B2 | 1/2016 | Jones et al. |
| 9,251,488 B2 | 2/2016 | Jones et al. |
| 9,443,218 B1 | 9/2016 | Stiefel et al. |
| 9,576,454 B2* | 2/2017 | Hosseini ............ G08B 13/2451 |
| 9,640,875 B2 | 5/2017 | Wilkinson et al. |
| 9,773,134 B2 | 9/2017 | Jones et al. |
| 9,818,084 B1 | 11/2017 | Diorio et al. |
| 9,858,738 B2 | 1/2018 | Wilkinson |
| 9,864,882 B1 | 1/2018 | Geist et al. |
| 9,892,358 B2 | 2/2018 | Wilkinson |
| 9,916,528 B2 | 3/2018 | Wilkinson |
| 10,013,860 B2 | 7/2018 | Hewett |
| 10,062,048 B2 | 8/2018 | High et al. |
| 10,073,992 B2 | 9/2018 | Jones et al. |
| 10,095,996 B2 | 10/2018 | Belstner et al. |
| 10,115,072 B2 | 10/2018 | Stokes et al. |
| 10,346,656 B2* | 7/2019 | Wilkinson ......... G06K 7/10297 |
| 10,373,464 B2 | 8/2019 | Wilkinson et al. |
| 10,380,390 B2 | 8/2019 | Jones et al. |
| 10,386,474 B2 | 8/2019 | Hewett |
| 10,460,137 B1* | 10/2019 | Landry, Sr. ........ G06K 19/0723 |
| 10,497,239 B2 | 12/2019 | Jeon et al. |
| 10,534,939 B1 | 1/2020 | Bellows |
| 10,535,053 B2 | 1/2020 | Wilkinson et al. |
| 10,592,959 B2 | 3/2020 | Wilkinson et al. |
| 10,614,504 B2 | 4/2020 | Wilkinson et al. |
| 10,657,491 B2 | 5/2020 | Stiefel et al. |
| 10,706,244 B2 | 7/2020 | Wilkinson et al. |
| 10,750,886 B2 | 8/2020 | Bode et al. |
| 10,820,171 B2 | 10/2020 | Jones et al. |
| 10,839,341 B2 | 11/2020 | Wilkinson et al. |
| 10,955,373 B2 | 3/2021 | Wilkinson et al. |
| 11,215,691 B2 | 1/2022 | Hewett et al. |
| 2005/0258961 A1 | 11/2005 | Kimball et al. |
| 2006/0077039 A1 | 4/2006 | Ibi et al. |
| 2006/0255943 A1 | 11/2006 | Hougen et al. |
| 2007/0080788 A1 | 4/2007 | Manley et al. |
| 2010/0073188 A1 | 3/2010 | Mickle et al. |
| 2011/0147467 A1 | 6/2011 | Choi |
| 2011/0169606 A1 | 7/2011 | Brandsma |
| 2013/0027191 A1 | 1/2013 | Wilkinson |
| 2014/0001258 A1 | 1/2014 | Chan et al. |
| 2014/0266615 A1 | 9/2014 | Ouyang et al. |
| 2014/0266616 A1 | 9/2014 | Jones et al. |
| 2014/0266618 A1 | 9/2014 | Jones et al. |
| 2015/0102903 A1 | 4/2015 | Wilkinson |
| 2016/0212831 A1 | 7/2016 | Dobai et al. |
| 2017/0372106 A1 | 12/2017 | Wilkinson |
| 2018/0350218 A1* | 12/2018 | Jeon .................. G06K 7/10475 |
| 2019/0073527 A1 | 3/2019 | DeBates et al. |
| 2019/0163942 A1 | 5/2019 | Lavery et al. |
| 2020/0059363 A1 | 2/2020 | Lobo et al. |
| 2020/0172337 A1 | 6/2020 | Wilkinson et al. |
| 2020/0356735 A1 | 11/2020 | Wilkinson |
| 2022/0014892 A1 | 1/2022 | Bengtsson et al. |
| 2022/0230040 A1 | 7/2022 | Bergman et al. |
| 2024/0169820 A1 | 5/2024 | O'Hagan |
| 2024/0346261 A1 | 10/2024 | Wilkinson |
| 2024/0346265 A1 | 10/2024 | Wilkinson |
| 2024/0346266 A1 | 10/2024 | Wilkinson |
| 2024/0346268 A1 | 10/2024 | Wilkinson |
| 2024/0346277 A1 | 10/2024 | Wilkinson |
| 2024/0346278 A1 | 10/2024 | Wilkinson |

OTHER PUBLICATIONS

International Search Report and Written Opinion for PCT/US2024/024218 dated Jul. 12, 2024.

Jenkins, Jon, "You can buy clothes, fan gear, and more without waiting in line with Amazon's Just Walk Out technology", Online Article, Sep. 19, 2023, 7 pages.

Koshiya, N. et al., "Enhancing Retail Store Inventory Management through RFID Technology & AWS", AWS for Industries, Jun. 26, 2023, 9 pages.

Office Action for U.S. Appl. No. 18/671,049 dated Aug. 26, 2024.
Office Action for U.S. Appl. No. 18/671,076 dated Aug. 2, 2024.
Office Action for U.S. Appl. No. 18/671,099 dated Sep. 6, 2024.
Office Action for U.S. Appl. No. 18/754,523 dated Nov. 26, 2024.
Office Action for U.S. Appl. No. 18/754,574 dated Sep. 18, 2024.

Smiley, Suzanne, "The 5 Biggest Companies Using RFID Today", RFID Insider, Feb. 19, 2024, 14 pages.

Wang el al., "Efficient Tag Grouping via Collision Reconciliation and Data Compression", IEEE Transactions on Mobile Computing, May 2021, 15 pages, vol. 20, No. 5, Retrieved from the internet URL: https://ieeexplore.ieee.org/stamp/stamp.jsp?tp=&arnumber=8986541.

Wang et al., "Session-Based Security Enhancement of RFID Systems for Emerging Open-Loop Applications", MIT Libraries, 2014, 10 pages, Retrieved from the internet https://dspace.mit.edu/handle/1721.1/103797.

* cited by examiner

SYSTEMS AND METHODS FOR DETECTING AND TRACKING MISSING RFID TAGS

CROSS-REFERENCE AND PRIORITY CLAIM TO RELATED PATENT APPLICATIONS

This patent application is a continuation of PCT patent application PCT/US24/24218, designating the United States, filed Apr. 12, 2024, and entitled "Session Control Broadcaster for RFID Systems", which claims priority to U.S. provisional patent application Ser. No. 63/458,999, filed Apr. 13, 2023, and entitled "Session Control Broadcaster for RFID Systems", the entire disclosures of each of which are incorporated herein by reference.

This patent application is also related to (1) U.S. patent application Ser. No. 18/671,049, filed May 22, 2024, and entitled "Systems and Methods for Detecting and Tracking Moving RFID Tags", (2) U.S. patent application Ser. No. 18/671,076, filed May 22, 2024, and entitled "Session Control Broadcaster for Zoned RFID Systems", (3) U.S. patent application Ser. No. 18/671,099, filed May 22, 2024, and entitled "Session Control Broadcaster for RFID Systems", (4) U.S. patent application Ser. No. 18/754,523, filed this same day, and entitled "Systems and Methods for Detecting and Tracking RFID Tags of Interest", (5) U.S. patent application Ser. No. 18/754,535, filed this same day, and entitled "Systems and Methods for Detecting and Tracking RFID Tags Using a Session Control Broadcaster", and (6) U.S. patent application Ser. No. 18/754,574, filed this same day, and entitled "Systems and Methods for Detecting and Tracking Out of Place RFID Tags", the entire disclosures of each of which are incorporated herein by reference.

INTRODUCTION

Using radio-frequency identification (RFID) technology to support inventory management is technically challenging, particularly in situations where the inventory includes a large number of items to be tracked within a geographic area; and even more particularly when there is a desire to track and manage the large inventory within the geographic area on a real-time basis. For example, conventional RFID systems exhibit technical challenges where substantial numbers of RFID tags are unreadable at any given time.

RFID tags are circuits that are configured to receive a radio-frequency (RF) signal and respond to that RF signal with a corresponding RF response signal. RFID tags are typically small, and RFID tags may be active devices (e.g., self-powered such as via a battery), passive devices (e.g., relying upon the received RF signal for their operating power), or hybrids of active and passive devices. It is often the case that RFID tags are encoded with an identifier that gets included in the RFID tag's response signal. In this fashion, RFID tags can be associated with items (such as inventory items) so that the RFID tags serve as identifiers for the items. For example, RFID tags can be attached to or embedded into items in an any of a number of manners, including but not limited to direct and indirect manners such as (1) attaching the RFID tags to the items themselves or the packaging for such items and (2) embedding the RFID tags in the items themselves or the packaging for such items. Moreover, the identifiers can be globally unique identifiers (GUIDs) if desired by a practitioner, in which case the GUIDs can uniquely identify a unique instance of an item (e.g., a particular product as distinguished from other products sharing the same characteristics as that product instance). Moreover, the identifiers used by RFID tags may encode additional information such as information about the nature of the item that the RFID tag is associated with (e.g., a class/type of item). The items that are linked to an RFID tag may also be associated with a variety of other identifiers that identify one or more characteristics or classifications for the items. For example, items can have associated Universal Product Codes (UPCs), Global Trade Item Numbers (GTINs, or more colloquially, G10s), an Stock Keeping Units (SKUs). UPCs and G10s serve as global identifiers for particular classes of items (in which case many items may share the same UPCs or G10s if they share the same pertinent characteristics; and moreover, the same UPC or G10 can often be linked to multiple RFID tag identifiers when the items linked to the RFID tag identifiers share the same UPC or G10). SKUs will often serve as locally unique identifiers for items from a particular retailer or the like, but SKU encoding may vary across retailers. As such, some items that share the same UPC or G10 may exhibit different SKUs when sold by different retailers.

The Electronic Product Code (EPC) is managed by EPC Global, Inc., and the EPC defines standards for RFID tags whereby EPC-based RFID tags have serial numbers that serve as GUIDs within the EPC system to uniquely identify each RFID tag (and by implication each item associated with each RFID tag on a one-to-one correspondence basis). These standards can be referenced as "EPC GEN2".

Some protocols for RFID tags permit an RFID tag to exhibit any of a plurality of different read states. For example, under the EPC GEN2 approach, RFID tags can exhibit the following properties. An RFID tag can exhibit a readable state or an unreadable state. Under typical default operations, a practitioner may choose to make an asserted state (an "A" state) for an RFID tag the readable state and make a de-asserted state (a "B" state) for an RFID tag the unreadable state. However, it should be understood that a practitioner could also design the system to employ the reverse (where the A state serves as the unreadable state and the B state serves as the readable state). In such a case, an RFID reader would query for tags that are in the B state rather than the default A state. When a tag in the A state is read by an RFID reader, that tag will transition from the A state to the B state. Similarly, when a tag in the B state is read by an RFID reader, that tag will transition from the B state to the A state. Moreover, RFID tags can be in any of a number of different sessions (Sessions 0, 1, 2, and 3), where the different sessions have different characteristics in terms of how the tags will naturally transition between the A/B states.

For example, when a tag in Session 0 gets read, that read will cause the tag to transition from the A state to the B state, but the tag will then immediately transition back to the A state. This means that a tag in Session 0 will effectively always stay enabled for readout by an RFID reader. Accordingly, it should be understood that running inventory on a large population of tags in Session 0 can be cumbersome and unwieldy because the number of tags that need to be read for a given inventory cycle may overwhelm the RFID reader.

As another example, when a tag in Session 1 gets read, that read will cause the tag to transition from the A state to the B state; and the tag will then remain in the B state for a time period of around 0.5 seconds to around 5 seconds, after which time the tag automatically returns to the A state. Thus, session 1 will keep tags "quiet" (or unreadable) for a certain time period after they get read.

As yet another example, when a tag in Session 2 or Session 3 gets read, that read will cause the tag to switch from the A state to the B state and remain in the B state indefinitely so long as the tag remains powered. If the tag becomes unpowered for a sufficient time duration (typically around 35 seconds or however long it takes for the tag's capacitor to fully discharge), then the tag will return to the A state. Thus, if a tag in the B state for Session 2 or 3 is removed from the field of an RFID reader such that the tag loses the energizing power of the RFID reader's signal for an extended period of time (e.g., around 35 seconds), then that tag will return to the A state, whereupon it can be read when it later returns within range of a reader. It is worth noting that by having two sessions with the same A/B transition properties, a facility can use different ones of Sessions 2 and 3 for different parts of the facility if desired (e.g., RFID readers that read tags on a sales floor can operate with tags in Session 2 while RFID readers that read tags in a storage backroom can operate with tags in Session 3, to permit separate tag readouts in Sessions 2 and 3 for a given tag while the tag is in the backroom and on the sales floor.

It should also be understood that a given tag might exhibit different A/B states for multiple different sessions simultaneously. For example, a given tag may exhibit an A state for Session 1 while exhibiting a B state for Session 2. Thus, such a tag would be readable by an RFID reader that is operating in Session 1, but it will not be readable by an RFID reader that is operating in Session 2.

However, it should be understood that even if an RFID tag is in a readable state, it may not be readable by an RFID reader used by an RFID system. For example, an RFID reader deployed in a fixed position (such as a ceiling of a facility) will transmit RF read signals over a geographic area. Within this geographic area, there will be "hot spots" where the read signals are readable by RFID tags and there will be "null spots" where the read signals are not readable by RFID tags. These null spots can arise for any of a number of reasons, including interference from other nearby objects (including people). For example, the physics of RF waves can cause each RF wave to add or subtract from other RF waves at the same location. When the RF waves combine in a manner where most of the RF waves are rising at the same spot, then the RF waves add together such that the sum of the RF power will be greater than the power of an individual RF wave due to constructive interference. This would be a hot spot. However, when the RF waves combine in a manner where most of the RF waves are falling at the same spot, then the RF waves subtract from each other such that the sum of the RF power will be less than the power of an individual RF wave due to destructive interference. This would be a null spot. Moreover, the locations of the hot spots and null spots may change over time as people and objects move within the subject geographic area.

In many RFID environments such as retail stores and warehouses, it is expected that perhaps as many as 30% of RFID tags may be located within a null spot of a geographic area at any given time. The precise percentage of tags that are located in null spots is expected to vary as a function of how closely spaced a set of RFID readers are positioned (where closely spaced RFID readers can be expected to result in a lower percentage of tags located in null spots, while RFID readers that are spaced farther apart can be expected to result in a higher percentage of tags located in null spots).

Thus, even if a given RFID tag is in a readable state, the given RFID tag will not be detected by an RFID reader if the given RFID tag is in a null spot when it is interrogated by the RFID reader. This results in a technical problem relating to how to better track such "hidden" RFID tags that cannot be read even though they are in a readable state.

Moreover, the inventor has counter-intuitively found that it is desirable for an RFID system to have many tags located in null spots, and the RFID system can be designed to uncover such hidden tags when they become present in hot spots as a mechanism for detecting and tracking tags that are likely moving. This stands in contrast to conventional approaches to RFID system design that are focused on eliminating null spots altogether so they can read all tags all the time.

For example, conventional RFID readers will spend some time performing inventory read tasks/operations and other time performing session control tasks/operations. With session control tasks/operations, the RFID reader communicates with populations of RFID tags to manage whether tags within the populations are in readable or unreadable states (e.g., an A state or B state). For example, a reader can manage session states by commanding tags to be in a Session 2/A state, Session 3/B state, etc. Of note, while performing session control tasks/operations, the RFID reader is unable to perform inventory read tasks/operations; and vice versa (while performing inventory read tasks/operations, the RFID reader is not able to perform session control tasks/operations). This means that if a hidden tag briefly enters a hot spot while the RFID reader is performing session control tasks/operations, but returns to the null spot before the RFID reader begins performing inventory read tasks/operations, this hidden tag will remain hidden to the system (see FIG. 3A discussed below).

In an effort to solve this technical problem in the art, disclosed herein is an RFID approach where session control tasks are offloaded from an RFID reader to a separate device which can take the form of an RFID transmitter such as a session control broadcaster. Accordingly, the RFID transmitter transmits messages to RFID tags to control which of the RFID tags within range of the RFID transmitter are in a readable state and/or unreadable state. These messages can take the form of session control messages. By offloading the transmission of messages that control the readability of RFID tags to a separate RFID transmitter, the RFID system frees up the RFID reader to spend more time on inventory read operations, which reduces the risk that an RFID tag will stay hidden when it briefly exists in a hot spot.

In an example scenario, a practitioner can leverage the characteristics of Session 2 or Session 3 to keep large tag populations within a coverage zone of an RFID reader in the B session state. This will significantly reduce the number of tags that will respond to the RFID reader's next inventory round because it will result in most of the tags exhibiting a B state for the next inventory round. When only a few tags are in the A state for a given inventory round, it is expected that the RFID reader can start new inventory rounds on a more frequent basis (e.g., every 50 to 100 ms) than would be the case when a conventional RFID reader is communicating with tags for both session control operations and inventory read operations. In an example embodiment, in order for a tag to participate in an inventory round, that tag must hear the initial query command from the RFID reader for the inventory round. With inventory rounds beginning every fraction of a second, even hidden tags that are quickly passing through a hot spot with a duration of around 100 ms will have a significantly improved opportunity for participating in the next inventory round by the RFID reader. By contrast, if a large population of tags are in the A state and participating in the next inventory round, the length of time to complete reading all of the tags in the A state will be long enough for there to be a strong chance that a hidden tag briefly moving through a hot spot will have returned to a null spot by the time of the next inventory round's initial query command, which means that the hidden tag will remain hidden for next inventory round. Because the inventive RFID system described herein allows the separate RFID transmitter to selectively control the readability states of tags of interest within the tag population while the RFID reader is performing inventory rounds, the frequency of new inventory rounds can be increased while still keeping the inventory rounds short, which improves the detectability of hidden tags within a tag population.

Moreover, the offloading of session control tasks to a separate RFID transmitter such as a session control broadcaster also allows an RFID system to spend more time focusing on controlling which RFID tags should be in a readable or unreadable state. For example, a control system can determine one or more RFID tags of interest based on defined criteria and then transmit session control messages to such RFID tags of interest to control their readability states to make them readable or unreadable as desired. This provides an RFID system with more granular control over the tag reading operations to be performed by the system.

Also disclosed herein are techniques for choosing which RFID tags within a population of RFID tags qualify as tags of interest that are to be targeted with session control messages.

For example, the RFID system can determine one or more tags that are moving and identify such moving tags as tags of interest that should be controlled to be in a readable state. Further still, the RFID system can identify one or more additional tags that have one or more specified relationships with such moving tags (e.g., tags that are expected to be displayed nearby the moving tag due to common attributes such as being associated with the same class of item), where these additional tags can also be classified as tags of interest that should be controlled to be in a readable state. For example, the detection of a hidden tag as a result of an RFID read operation means that something "interesting" is happening around the location where that hidden tag was positioned when it was detected. The RFID-based detection of the hidden tag is a reliable indication that a person (e.g., a customer, employee, or other actor) has likely interacted in some fashion with the location where the hidden tag was located when detected. For example, the person may have picked up an item to which the hidden tag is linked or otherwise shuffled, moved, or re-positioned one or more items at that location in a fashion that caused the hidden tag to shift into a hot spot. By forcing a group of tags in the subject location to be in a readable state, the system allows for detecting and tracking this group of tags in a manner that allows a system to draw inferences about the intentionality of a person who had taken the action that caused the hidden tag to be detected. For example, successive RFID reads of the readable tags can allow a control system to evaluate and weigh the probability of various events occurring such as a customer placing an item in his or her shopping cart, a store employee replenishing or re-zoning a display area within a store, or even a bad actor who might be attempting to steal an item.

As another example, the RFID system can determine that a tag within a population of tags that has not been read within a defined time period is a tag of interest. The RFID system can identify such a "missing" tag as a tag of interest to be targeted with a session control message that forces the "missing" into a readable state.

Furthermore, groups of tags of interest can be defined using a mask that encompasses a plurality of RFID tag identifiers for the tags of interest. Through such a mask, a session control message can be generated that is multicast to the group of tags of interest.

Moreover, disclosed herein are example systems that employ multiple RFID transmitters operating as session control broadcasters and/or multiple RFID readers to cover different zones within a coverage area of an RFID system.

Further still, a variety of different embodiments are disclosed for implementing the session control broadcaster and RFID reader, including embodiments where the session control broadcaster and RFID reader share access to a common pool of antennas for communicating with RFID tags.

The inventor further notes that the innovative RFID approaches described herein are expected to be superior to camera-based techniques for identifying items in facilities such as retail stores and warehouses due to the improved efficiency of RFID tag reading operations. As recent reports in the news indicate, existing camera-based approaches for item identification suffer from a lack of automation and require extensive human intervention. For example, according to reporting by The Information, Amazon's camera-based "Just Walk Out" technology for self-checkout and purchase of items by customers in grocery stores required the use of more than 1,000 workers to remotely watch and label videos produced by the in-store cameras to ensure accurate checkouts. With this context, it is believed that the innovative RFID approaches described herein will provide extensive automation improvements relative to camera-based approaches that are known in the art.

These and other features and advantages of the disclosed inventions will be described in greater detail below with reference to the drawings.

DETAILED DESCRIPTION OF EXAMPLE EMBODIMENTS

Figure 1:
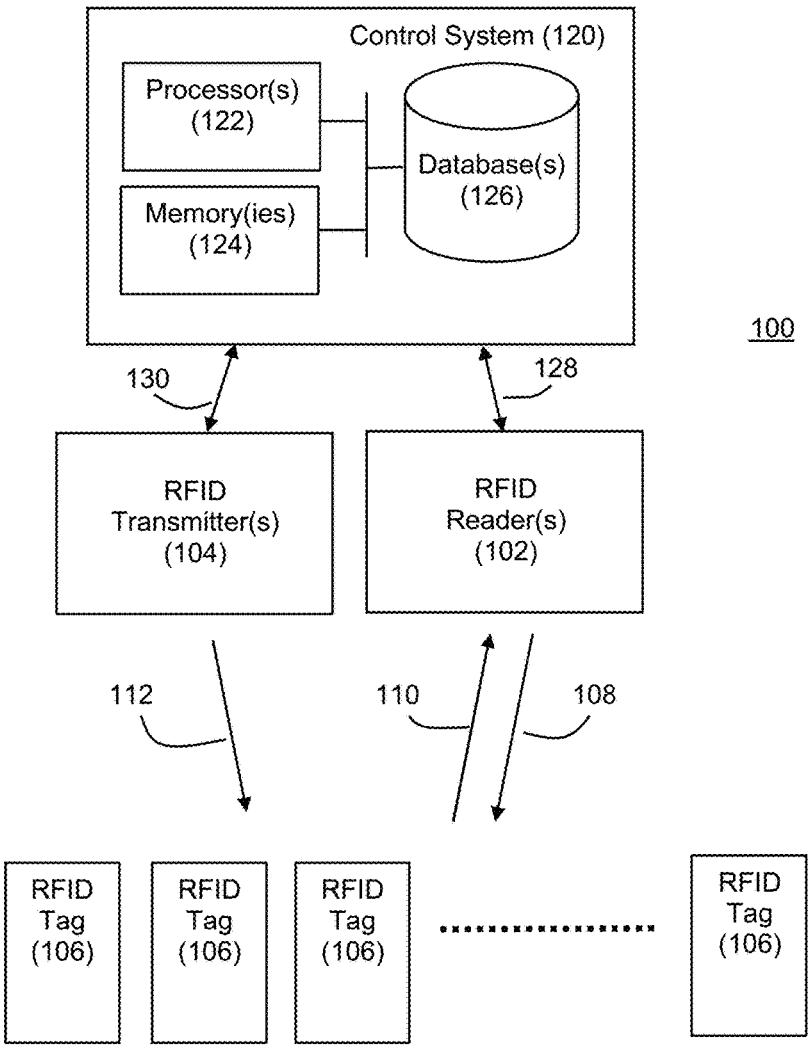
FIG. 1 depicts an example RFID system for an example embodiment.

FIG. 1 depicts an example RFID system 100 for an example embodiment. The RFID system 100 comprises an RFID reader 102 and an RFID transmitter 104, where the RFID reader 102 and RFID transmitter 104 wirelessly communicate with a plurality of RFID tags 106. A control system 120 can control the operations of the RFID reader 102 and RFID transmitter 104. The system 100 can be deployed in any of a number of environments. For example, the environment in which the system 100 is deployed can be a facility such as a retail store, warehouse, or distribution center. However, it should be understood that the system 100 could be used in other types of facilities (e.g., hospitals, airports, factories, military facilities, government buildings, casinos, office buildings, residences (homes, apartments, condominiums and the like), etc.). Moreover, the coverage area for system 100 can be a portion of a facility (e.g., a display/shopping area of a retail store, a storage area of a retail store, etc.) or all of a facility (e.g., an entire retail store) depending on the needs and desires of a practitioner. Further still, the environment in which the system 100 is deployed need not be limited to indoor facilities. For example, system 100 can be used in outdoor spaces (e.g., streets, parks, etc.) or in combinations of indoor/outdoor spaces. As examples, the RFID reader 102 and/or RFID transmitter 104 could be deployed on outdoor infrastructure such as poles or other structures that support street lights, street signs, traffic lights, cellular communication equipment, etc. Moreover, in some example embodiments, the RFID reader 102 and/or RFID transmitter 104 can be located in a fixed position such as by attaching the RFID reader 102 and/or RFID transmitter 104 as fixed infrastructure in an environment (e.g., installations in a ceiling of a facility). However, in other example embodiments, the RFID reader 102 and/or RFID transmitter 104 can be located in a mobile device. When deployed in a mobile device, such as a handheld device or wearable device, the RFID reader 102 and/or RFID transmitter 104 can be moved to different positions to change the areas that are covered.

The RFID reader 102 performs interrogation of the RFID tags 106. To perform such interrogation, the RFID reader 102 can wirelessly transmit RF signals that serve as read request messages 108 (such as inventory read messages) for reception by the RFID tags 106. RFID tags 106 that are within range of the messages 108 and are in a readable session state can respond to such messages 108 by wirelessly transmitting RF signals that serve as response messages 110 for reception by the RFID reader 102. These response messages 110 can include the identifiers for the responding RFID tags 106. In this fashion, the RFID reader 102 can interrogate/poll an environment for RFID tags 106 that are present in the coverage zone of the RFID reader 102 and which are in a readable session state.

The RFID transmitter 104 can wirelessly transmit RF signals that serve as session control messages 112 for reception by the RFID tags 106. These session control messages 112 can be targeted to specific RFID tags 106 that are within range of the RFID transmitter 104; and the session control messages 112 can be operable to control a readability state for the specific RFID tags 106 to which the session control messages 112 are targeted. For example, the session control messages 112 can be configured to force one or more specific RFID tags 106 to be in a readable session state. In another example, the session control messages 112 can be configured to force one or more specific RFID tags 106 to be in an unreadable session state. The RFID transmitter 104 as configured to transmit session control messages 112 to targeted RFID tags 106 can be referred to as a session control broadcaster (SCB).

In an example embodiment, the read request messages 108 can take the form of query commands from the RFID reader 102, and the session control messages 112 can take the form of select commands from the RFID transmitter/ session control broadcaster 104 that target one or more selected RFID tags 106 with a command to assert or de-assert a readable session state.

Query commands operate to interrogate a population of RFID tags 106 for their presence as part of an inventory reading cycle (which can be referred to as an inventory round). When the RFID reader 102 generates and transmits a query command, the RFID reader 102 can identify the relevant session for the query command (e.g., Session 0, 1, 2, or 3). The RFID tags 106 that are in a readable state for the identified session would then respond (presuming they are in a hot spot).

The query command can include a sequence of query commands from the RFID reader 102 as part of the inventory round. As a result of the initial query command for an inventory round, the RFID reader 102 tells the readable tags 106 within the population of readable tags to randomly select a number (within a depth of numbers that should generally align with the size of the population of readable RFID tags 106 being queried—e.g., for a population of 500 tags, randomly picking a number between 0 and 499). The RFID reader 102 then transmits a signal instructing the RFID tag 106 which picked "0" to announce itself. If one of the readable tags 106 (e.g., the "A state" tags 106) had picked "0", that tag 106 begins modulating its impedance in accordance with its RFID tag identifier. The other readable tags 106 that had not picked "0" would not be modulating their impedance. Meanwhile, the RFID reader 102 is outputting a carrier wave. The non-modulating tags 106 will either perfectly absorb or reflect the carrier wave from the RFID reader 102. By contrast, the modulating RFID tag 106 will reflect or absorb the carrier wave as a function of the 1's and 0's of its RFID tag identifier. Accordingly, the RFID reader 102 will receive an RF signal from the modulating RFID tag 106 that is a modulation of the carrier wave; and the RFID reader 102 can process this modulated signal to extract the RFID tag identifier from it. This allows the RFID reader 102 to identify the responsive tag 106 based on the extracted RFID tag identifier.

The RFID reader 102 can then transmit a signal that tells the population of tags 106 to decrement their number by 1. The modulation process can then repeat itself for the next tag 106 whose number is now at "0". This process can then be iteratively repeated for the remaining tags 106 until the RFID reader 102 has worked its way through the population of readable tags 106. It should be understood that the inventory round will require a fair amount of time to run its course if there is a large population of tags 106 in a readable session state.

Select commands can operate to tell one or more tags 106 to take an action such as asserting their readable state or asserting their unreadable state. The select commands can exhibit a bit sequence message format such as (1) a group of bits in a first defined location in the bit sequence that identify the message as a select command, (2) a group of bits in a second defined location in the bit sequence that identify one or more tags 106 to which the select command is targeted, and (3) a group of bits in a third defined location in the bit sequence that tells the targeted tag(s) to assert (or de-assert) their readable state. The session control broadcaster 104 can then modulate this select command onto an RF signal for transmission. The targeted RFID tag(s) 106 would then receive this RF signal and update its readability state in accordance with the select command encoded by this RF signal; while the non-targeted tags 106 would ignore the select command encoded by this RF signal.

It should be understood that a practitioner may choose to include multiple RFID readers 102 and/or RFID transmitters 104 in the system 100. As such, the system 100 may comprise one or more RFID readers 102 and/or one or more RFID transmitters 104.

Control system 120 operates to make decisions and control the operations of the RFID reader 102 and session control broadcaster 104 based on such decisions. Control system 120 may comprise a computer system that includes one or more processors 122, one or more memories 124, and one or more databases 126. Moreover, the computer system 120 may communicate with the RFID reader 102 and session control broadcaster 104 via communication links 128 and 130 respectively. For example, the control system 120 can provide control signals to the RFID reader 102 via communication link 128, where these control signals control when and how the RFID reader performs inventory read operations. For example, the control system 120 can provide a simple enable or start signal to the RFID reader 102 via communication link 128 that tells the RFID reader 102 to begin running inventory rounds. As another example, the control system 120 can provide control signals to the session control broadcaster 104 via communication link 130, where these control signals provide the session control broadcaster 104 with a list of RFID tag identifier information for the RFID tags 106 to which the session control broadcaster 104 is to target session control messages 112. This RFID tag identifier information may comprise partial RFID tag identifiers for the targeted RFID tags (e.g., a SKU portion, UPC portion, or GTIN/G10 portion) of an RFID tag identifier for a targeted RFID tag), or this RFID tag identifier may comprise one or more full RFID tag identifiers for one or more targeted RFID tags. In this fashion, the control system 120 can granularly manage the population of RFID tags 106 that are to be read by the RFID reader 102.

Communication links 128 and 130 may comprise wired or wireless communication links. For example, data cables can link the control system 120 with the RFID reader 102 and/or session control broadcaster 104 to provide wired communication links 128 and/or 130. As another example, the communication links 128 and/or 130 can provide wireless connectivity via WiFi, cellular, or other wireless connectivity techniques.

The database(s) 126 can store data about the items being tracked by system 100. This data can include RFID tag identifier information for the RFID tags 106 in association with a number of attributes for the items with which the RFID tags are linked. For example, in a warehouse or retail store scenario, the database(s) 126 can associate RFID tag identifiers (full or partial) with item names, item classes/types (e.g., item SKUs, UPCs, and/or G10s), and other item characteristics. Moreover, as noted above, the RFID tag identifiers can serve as globally unique serial numbers for their associated items. It should be understood that the database(s) 126 may comprise multiple databases that are distributed across multiple computer systems if desired by a practitioner.

The processor(s) 122 can be any compute resource suitable for carrying out the operations described herein. For example, the processor(s) 122 may take the form of one or more microprocessors, digital signal processors (DSPs), graphics processing units (GPUs), field programmable gate arrays (FPGAs), application-specific integrated circuits (ASICs), etc. The memory(ies) 124 can be any form of non-transitory computer-readable storage media (e.g., computer memory) capable of cooperating with the processor(s) 122 to carry out the operations described herein, including but not limited to volatile memory (e.g., RAM) and/or non-volatile memory (e.g., ROM). For example, the memory 124 can store software code/instructions for execution by the processor 122 to carry out the processing operations described herein.

In some embodiments, the control system 120 may comprise one or more servers that are located on-site or off-site with respect to the premises being monitored by the RFID system 100 (e.g., a warehouse, retail store, etc.). However, it should be understood that some or all of the control system 120 may be deployed as a distributed computing system deployed across multiple computer systems. As an example, the control system 120 may be deployed at least in part as a cloud system that is remote from the premises being monitored by the RFID system 100.

Figure 2:
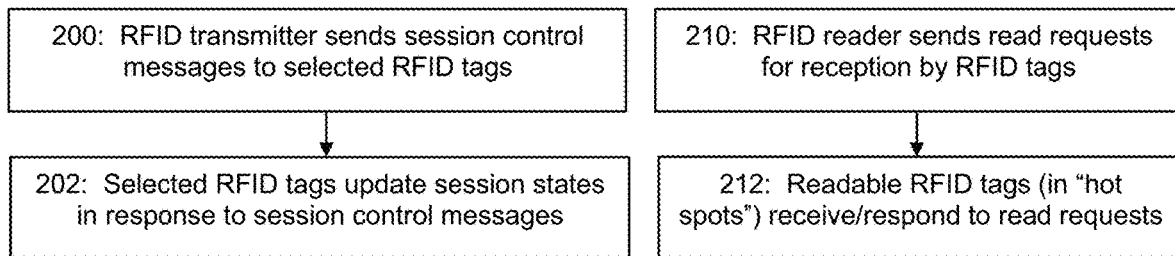
FIG. 2 depicts example process operation flows for an RFID transmitter and RFID reader with respect to an example RFID system.

FIG. 2 depicts example process operation flows for the session control broadcaster 104 and RFID reader 102 with respect to the RFID tags 106.

Steps 200 and 202 can be performed in connection with exercising control over the session states exhibited by the RFID tags 106. At step 200, the session control broadcaster 104 wirelessly sends session control messages 112 to the RFID tags 106. At step 202, the RFID tags 106 update their session states in response to the received session control messages 112. As explained above and below, the session control broadcaster 104 can target the session control messages 112 to one or more of the RFID tags 106. Thus, while all of the RFID tags 106 that are within range of the session control broadcaster 104 may receive the session control messages 112, the non-targeted RFID tags 106 would ignore the session control messages 112 that are not addressed to them.

Steps 210 and 212 can be performed in connection with exercising control over inventory read operations. At step 210, the RFID reader 102 interrogates the RFID tags 106 by sending inventory read request messages 108 for reception by the RFID tags 106. The readable RFID tags 106 that are within range of the RFID reader 102 (namely, those RFID tags 106 that are located in a "hot spot" of the coverage zone for the RFID reader 102 and are in a readable session state) will then receive the read request message 108 and wirelessly transmit a response message 110 for reception by the RFID reader 102. The response message 110 generated by a subject RFID tag 106 can include the RFID tag identifier for the subject RFID tag 106. For ease of reference, an RFID tag 106 that is in a readable session state can be referred to herein as an "read-enabled" tag 106 or even more simply as an "enabled" tag 106.

With the system 100 of FIG. 1 (where session control tasks are offloaded from the RFID reader 102), it should be understood that steps 200 and 202 can be performed concurrently with steps 210 and 212 if desired by a practitioner. This can improve system 100 relative conventional RFID systems because the RFID reader 102 is freed to spend more time on tasks other than session control tasks. For example, as demonstrated by FIGS. 3A and 3B, the RFID reader 102 can spend more time running inventory read operations.

Figures 3A, 3B, 4:
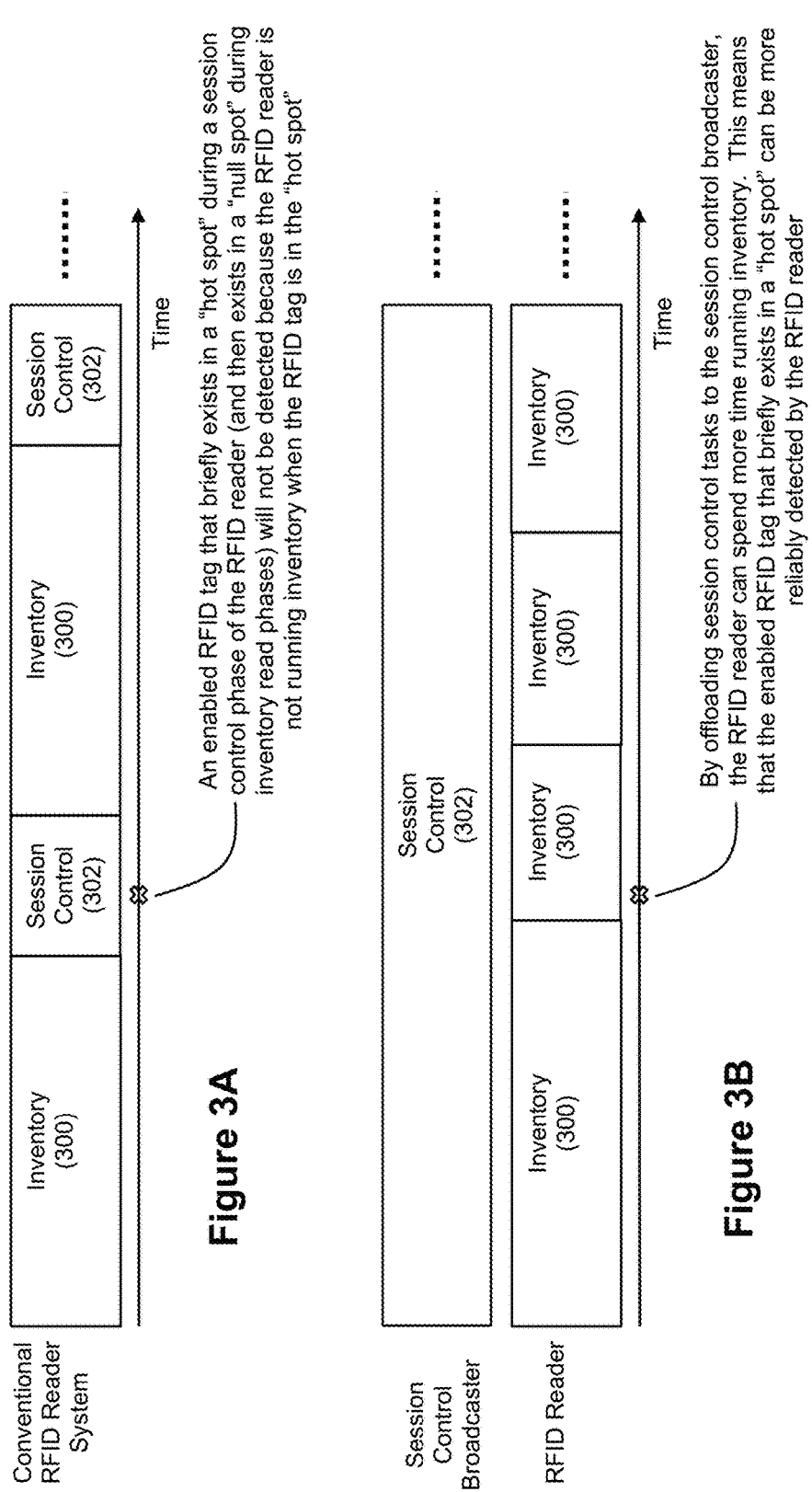
FIG. 3A depicts an example timeline for a flow of operations by a conventional RFID system that performs inventory management operations.
FIG. 3B depicts an example timeline for a flow of operations where the RFID system offloads session control tasks from an RFID reader that performs inventory reads.
FIG. 4 depicts an example process flow for targeting session control messages to RFID tags of interest.

FIG. 3A shows an example timeline for a conventional RFID reader system where the conventional RFID reader must divide its time between running inventory operations 300 and running session control operations 302. With this conventional approach, an enabled RFID tag 106 may be positioned in a "null spot" of the conventional RFID reader. This "null spot" may arise due to factors such as the presence of noise in the location where the subject tag 106 is positioned. While the enabled tag 106 is located in the null spot, it is unreadable by the conventional RFID reader. This enabled tag 106 that it is generally within range of the RFID reader but located in a null spot of the RFID reader's coverage zone can be referred to as a "hidden" tag as noted above. The hidden tag may briefly become located in a "hot spot" of the RFID reader only to quickly return back to the "null spot" as shown by the "x" on the timeline of FIG. 3A. This brief transit by a hidden tag from a null spot to a hot spot and back to a null spot can arise due to any of a number of actions. For example, a person may handle an item to which the hidden tag is attached, which causes the hidden tag 106 to briefly enter a hot spot. For example, when the hidden tag is attached to a product on a shelf, a person may briefly pick up the product and its attached hidden tag and return it to the shelf (or may shift/shuffle the product and its attached hidden tag on the shelf). As another example, a person or object that briefly moves near the hidden tag may change the noise environment of the hidden tag such that signal interference is briefly reduced so that the hidden tag is no longer located in a null spot. However, if this brief time period during which the hidden tag is located within a putative hot spot occurs during a time when the conventional RFID reader is running session control tasks 302 rather than inventory reads 300, this hidden tag will remain hidden because the RFID reader is not ready to read the hidden tag when the hidden tag briefly exists in a hot spot. Similarly, if the brief time during which the hidden tag is located in a hot spot occurs outside the window of the initial query command of a subject inventory round 300 that hidden tag will remain hidden for the inventory round 300 because the inventory round 300 will only cover tag that received the initial query command in time to assign themselves the number that governs when the tag would announce itself to the RFID reader.

By contrast, with the approach of FIG. 1, the RFID reader 102 can spend more time running inventory operations 300 because the session control operations 302 have been offloaded to the session control broadcaster 104. As shown by FIG. 3B, this means that the hidden tag that briefly exists in the hot spot will have a much better chance of being detected by the RFID reader 102 since the RFID reader 102 can be running inventory operations 300 while the hidden tag briefly becomes unhidden when that tag is briefly located in a hot spot of the RFID read request message 108. Further still, because the session control broadcaster 104 can finely control which tags 106 are in a readable session state, this means that a practitioner can design the system 100 so that the population of readable tags 106 can be kept small for many of the inventory rounds, which means that the duration of many inventory rounds can be shortened, which further improves the chance that an otherwise hidden tag might be able to receive and process an initial query command during an inventory round.

FIG. 4 depicts an example process flow for targeting session control messages 112 to RFID tags of interest. At step 400, a determination is made regarding which of the RFID tags 106 qualify as tags of interest (TOIs). These determined TOIs can serve as the select tags 106 to be targeted with session control messages 112. The determination of which tags 106 qualify as TOIs can be based on any of a number of defined criteria. In an example embodiment, step 400 can be performed by one or more processors 122 in control system 120. The criteria by which the control system 120 determines which of the RFID tags 106 are TOIs can be defined by code/instructions executed by the processor(s) 122.

An example of criteria that can be used for identifying TOIs can be one or more criteria that indicate a tag 106 is moving. A practitioner may find it desirable to configure the system 100 so that moving tags 106 are largely kept in a readable state. Any of a number of criteria can be used to determine whether a tag 106 should be classified as a moving tag.

For example, when the RFID system 100 is operating in Session 2 or Session 3, it is expected that effectively all of the tags 106 that are in a hot spot of the RFID reader 102 will be in an unreadable state after an initial inventory round. However, there may be some tags 106 that were hidden in a null spot of the RFID reader 102, and these hidden tags may still be in a readable state. If the hidden tag 106 in the readable state moves into a hot spot (or if a hot spot moves onto the hidden tag 106 in the readable state), this hidden tag 106 will be uncovered and read by the RFID reader. The detection of this previously hidden tag by the RFID reader 102 when operating in Session 2 or Session 3 can serve as criteria that support a conclusion that the subject tag 106 should be classified as a likely moving tag because of a likelihood that the detection of the subject tag 106 was caused by its movement. Another possible conclusion would be that the subject tag 106 is stationary, but the location of the hot spot moved. As an example, a mechanism for determining whether a detected tag 106 was a previously hidden tag can be based on read history data that indicates the subject tag 106 has not been recently read by the system 100 (e.g., not read within a defined time window). The database(s) 126 can keep such read history data in log files or the like. By characterizing the subject tag 106 as a TOI, the session control broadcaster 104 can keep the subject tag 106 in a readable state so that subsequent reads can reveal more about whether the subject tag 106 is in fact moving or if the subject tag 106 is a stationary tag that was uncovered because of a change in location of the hot spot.

As another example, variations in signal strength received from a tag 106 can indicate that the tag 106 is moving. In this regard, for an example embodiment, if the system 100 registers variations in a received signal strength indicator (RSSI) from a tag 106 that are in excess of a defined variation threshold, that variation in RSSI could be used by the control system 120 to classify the tag as moving. As yet another example, variations in which reader or antenna picks up signals from a tag 106 can indicate that the tag 106 is moving. For example, if system 100 employs multiple RFID readers 102 that cover different regions, the control system 120 can determine whether a particular tag that was previously detected by Reader A is now detected by Reader B. Similarly, if system 100 employs an RFID reader with multiple antennas that cover different regions, the control system 120 can determine whether a particular tag that was previously detected by Antenna A of the reader is now detected by Antenna B of the reader. If the read history shows a particular tag being read by different readers or antennas over time, the control system 120 can classify that tag as moving. Further still, if a particular tag 106 is read by an RFID reader that covers a known transit zone in a facility, this can be an indicator that the particular tag 106 is moving. For example, if an RFID reader is positioned to read tags passing between a retail store's storage backroom and the retail store's sales floor, the detection of a particular tag 106 by this reader would indicate that the particular tag 106 might be on the move. As another example, an RFID reader positioned to read tags near a customer checkout area can be used to read tags that might be classified as moving tags.

The control system 120 can also determine that one or more additional tags that have one or more specified relationships with a moving tag qualify as TOIs. For example, the database(s) 126 may indicate that one or more additional tags are expected to be displayed nearby the tag that was found to be moving—such as if the tags share attributes like being associated with the same class of item or being associated with items that are known to be displayed or stored together in a facility. A practitioner may find it desirable to control such additional tags to be in a readable state so a determination can be made whether a group of tags 106 might be moving together (perhaps indicating a bulk move of items by an employee to re-position a group of items) or if only one tag 106 linked with a particular class of items is moving (perhaps indicating a customer pickup of a particular item).

Another example of criteria that can be used for identifying TOIs can be one or more criteria that indicate a tag 106 has not been read within a defined time period. Such tags can be characterized as missing tags. Given that tags might spend extended periods in an unreadable state, there is a chance that such tags could become effectively lost or "missing" within the system 100. To reduce this risk, the control system 120 can determine whether a defined time threshold has expired since the last time a given tag was read within the system 100. If this time threshold has expired for a particular tag 106, that tag can be classified as a TOI and a session control message 112 can be targeted to it so that the missing tag is forced into a readable state (presuming the missing tag is still present). A practitioner can choose to set the defined time threshold based on any of a number of factors. For example, an item linked to a tag 106 might have an expected inventory turn time that represents how long the item will typically sit on a shelf before it is purchased by a customer. This expected inventory turn time can be stored as an attribute of an item in database(s) 126. The system 100 can define the time threshold to approximate this inventory turn time. As another example, the item might have an expected intake turn time that represents how long the item will typically sit in a backroom storage area after intake from a shipper until it gets stocked on a shelf for display on a sales floor. This intake turn time can also be stored as an attribute of an item in database(s) 126, and the system 100 can defined the time threshold to approximate this intake turn time. In this regard, if a tag 106 has not been read within time period in excess of the inventory turn time and/or intake turn time, such a tag 106 can be flagged as a TOI. Furthermore, a practitioner may find it desirable to use a session control broadcaster 104 to force missing tags into a readable state during off-hours for a facility when it is expected that tags 106 will not be moving.

Yet another example of criteria that can be used for identifying TOIs can be one or more criteria that indicate a tag 106 is "out of place", as discussed in greater detail below.

At step 402, the session control broadcaster 104 generates and transmits session control messages 112 that are targeted to the determined TOIs. In an example embodiment, these messages 112 can be configured to include commands such as select commands that force the determined TOIs to exhibit a readable session station. In this regard, for a determined TOI that is in a quiescent (unreadable) session state, the session control message 112 targeting that determined TOI can cause the determined TOI to switch from the quiescent (unreadable) state to an enabled (readable) state. However, it should be also understood that a practitioner may also configure the system 100 so that some or all of the session control messages 112 are operative to cause the determined TOIs to exhibit a quiescent (unreadable) state. For example, it may be the case that there is a desire to ensure that a particular group of tags 106 are quiescent for a particular time period. The control system 120 can provide a list of the determined TOIs from step 400 to the session control broadcaster 104 for the session control broadcaster 104 to use at step 402 when generating the session control messages 112.

Furthermore, in an example embodiment, the session control broadcaster 104 can be configured to perform step 402 for the determined TOIs such that the session control broadcaster 104 cycles through and repeatedly sends the session control messages 112 that target the determined TOIs so as to keep the determined TOIs in the desired readability state. This means that so long as a particular tag is on a list of TOIs maintained by the session control broadcaster 104, the session control broadcaster 104 will repeatedly switch the particular tag to the readable state even if the RFID reader 102 reads the particular tag one or more times during this time period. Should the control system 120 later decide that a particular tag 106 no longer qualifies as a TOI, the control system 120 can send a message to the session control broadcaster 104 that is effective to remove that particular tag from the list of TOIs for which session control messages 112 are generated and transmitted.

Figure 5:
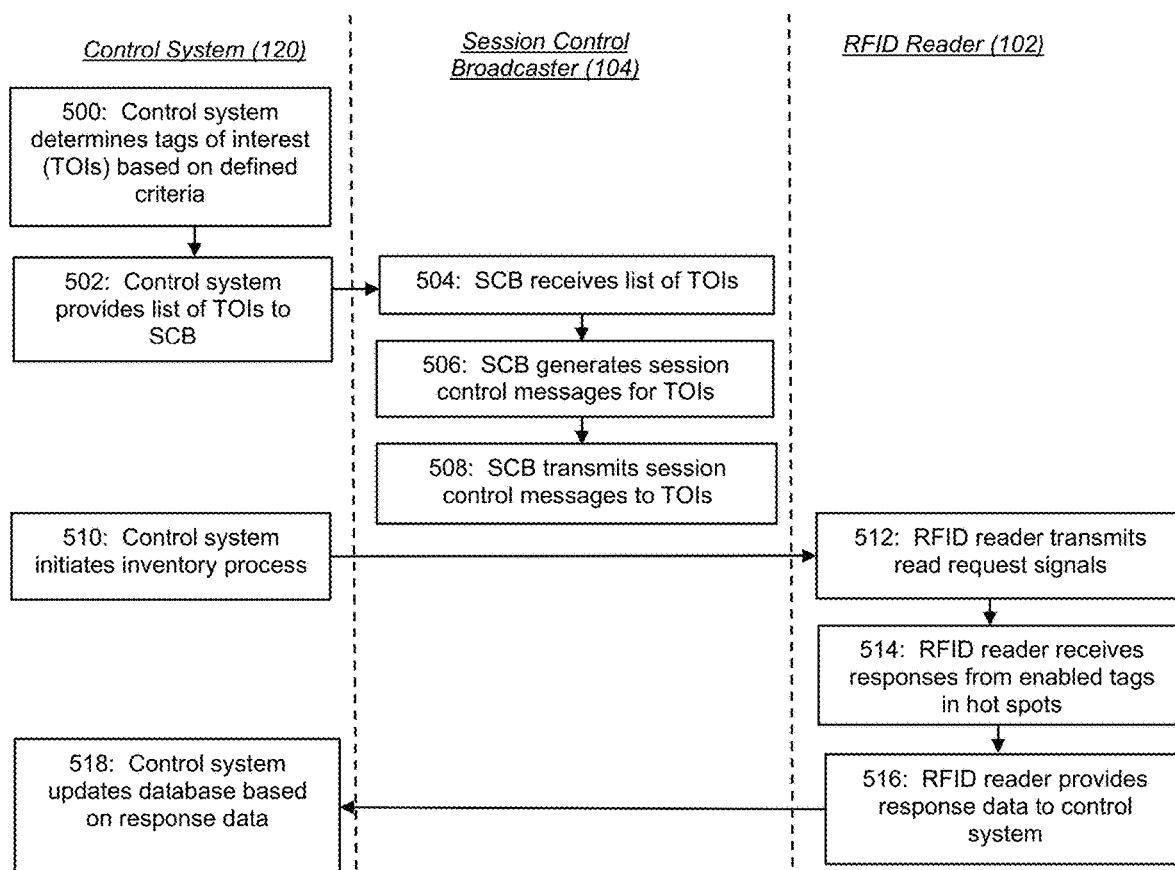
FIG. 5 depicts another example process flow for use with respect to an example RFID system.

FIG. 5 depicts an example of a process flow of coordinated operations as between the control system 120, session control broadcaster 104, and RFID reader 102.

At step 500, the control system 120 determines the TOIs based on defined criteria as noted above with respect to step 400 of FIG. 4. At step 502, the control system 120 provides a list of the determined TOIs to the session control broadcaster 104 via communication link 130. The determined TOIs can be identified based on their RFID tag identifier information (partial or full).

At step 504, the session control broadcaster 104 receives this list of determined TOIs, and the session control broadcaster 104 generates session control messages 112 for the select TOIs on the list (see 506). For example, as noted above, the list can include RFID tag identifier information (partial or full) for the determined TOIs; and the session control broadcaster 104 can extract the RFID tag identifier information from the list. Session control messages 112 can then be generated at step 506 that target the determined TOIs using the RFID tag identifier information together with select commands that are operable to cause the determined TOIs to exhibit the desired session state (e.g., an enabled (readable) session state). At step 508, the session control broadcaster 104 wirelessly transmits the session control messages 112 as RF signals to be received by the determined TOIs. As noted above, this will cause the determined TOIs that are within range of the session control broadcaster 104 to exhibit the desired session state. It should be understood that, if desired by a practitioner, these transmissions can be one-way broadcasts from the session control broadcaster 104 that do not require any receipt acknowledgment or the like to be transmitted back from the determined TOIs.

The control system 120 can also provide a command to the RFID reader 102 via communication link 128 that initiates inventory reading operations by the RFID reader 102 (see step 510). In response to this command, the RFID reader 102 can then wirelessly transmit RF signals that serve as read request messages 108 for an inventory round (see step 512). As noted above, these RF signals can initiate a sequence of query commands where the different enabled RFID tags 106 that receive the read request messages 108 generate RF signals which serve as response messages 110 that identify their presence. It should be understood that the responsive RFID tags 106 will be those tags 106 that are in an enabled session state and are located in a hot spot such that they receive the message(s) 108. At step 514, the RFID reader 102 receives these response messages 110, where the response messages 110 include data indicative of the RFID tag identifiers for the responsive RFID tags 106. Of note, the responsive tags 106 can include the TOIs that were forced into a readable session state by the session control messages 112 transmitted at step 508. The RFID reader 102 can extract the RFID tag identifiers from the response messages 110. It should be understood that the response messages 110 may include other metadata that could get extracted by the RFID reader 102 (such as "sell by" dates, "best by" dates for perishable items, promotional data about items, etc. that may be encoded in a memory of an RFID tag 106). At step 516, the RFID reader 102 provides response data to the control system 120 via communication link 128, where this response data can include the RFID tag identifiers for the responsive RFID tags 106 (and other metadata if applicable).

At step 518, the control system 120 updates the database(s) 126 based on the response data received from the RFID reader 102. For example, the database(s) 126 can be updated to log the times at which the various RFID tag identifiers were detected in the coverage area of the RFID reader 102.

Figure 6:
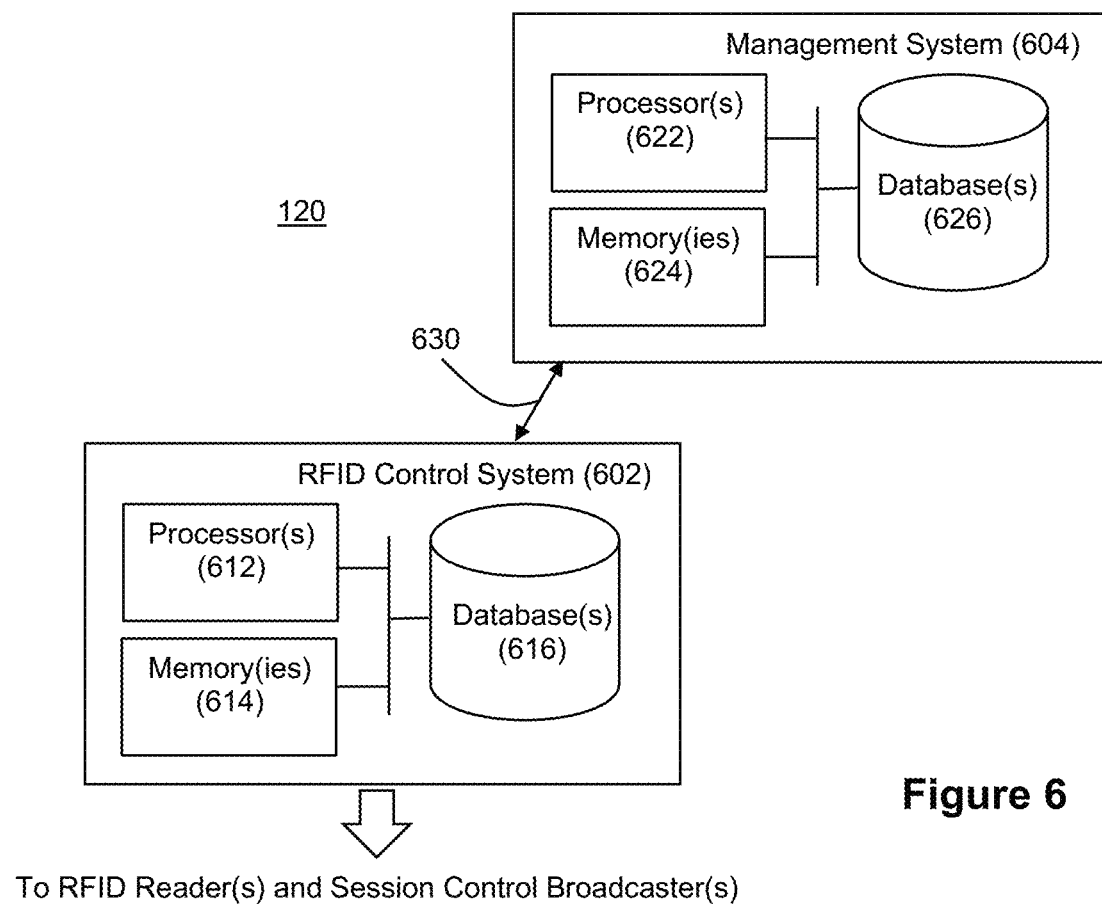
FIG. 6 depicts an example architecture for a control system of an RFID system.

In an example embodiment, the control system 120 can include an RFID control system 602 and a management system 604 as shown by FIG. 6. The RFID control system 602 can provide the command and control interface with the RFID reader(s) 102 and session control broadcaster(s) 104 of system 100. The management system 604 can serve as a backend enterprise resource planning (ERP) system or other enterprise management system (EMS). The RFID control system 602 and the management system 604 can communicate with each other over a communication link 630, where communication link 630 can be a wired or wireless communication link. RFID control system 602 can comprise one or more processors 612, one or more memories 614, and one or more databases 616. Similarly, management system 604 can comprise one or more processors 622, one or more memories 624, and one or more databases 626. As such, with reference to FIG. 1, it should be understood that processor(s) 122 may include one or more processors 612 and one or more processors 622, memory(ies) 124 may include one or more memories 614 and one or more memories 624, and database(s) 126 may include one or more databases 616 and one or more databases 626.

The database(s) 616 maintained by the RFID control system 602 can log and track RFID read activity by each RFID reader 102 within system 100. The database(s) 616 can associate read RFID tag identifiers with a number of different attributes. For example, database(s) 616 can include a time series database of RFID tag identifiers read by each RFID reader 102, and this time series may include several fields of metadata associated with each read RFID tag identifier (such as a time at which each read occurs, an RSSI for each read, which RFID reader 102 read the subject tag (as applicable) and/or a location or region associated with such reader 102, which antenna of the RFID reader read the subject tag (as applicable) and/or a location or region associated with such antenna, and/or the phase of the tag reads on each antenna (as applicable), etc.

The database(s) 626 maintained by the management system 604 can include data that associates RFID tag identifier information (partial or full) with a variety of data relating to the items to which the RFID tags 106 are attached or otherwise linked. For example, database(s) 626 can include data attributes that define modulars or planograms for a retail store or warehouse to identify where different items are located in a facility. Further still, the database(s) 626 can identify a number of different attributes of the items linked to the RFID tags 106, such as a class of item, a vendor or supplier for the item, etc. Thus, the SKU portion, UPC portion, and/or G10 portion of an RFID tag identifier can be associated by database(s) 626 with items at any of a number of levels of generality such as a particular unique/serialized instance of an item (an electronic product code (EPC), a serialized GTIN (SGTIN, or more colloquially, SG10), or full RFID tag identifier), a particular class of item (e.g., size 10 men's shoes), a general category of item (shoes), the number of items on hand, sizes of items, weights of items, and/or prices for items, etc.

Moreover, while FIG. 6 shows an example where control system 120 includes the RFID control system 602 and management system 604, it should be understood that for some embodiments the control system 120 may include the RFID control system 602 but not the management system 604.

Figure 7A:
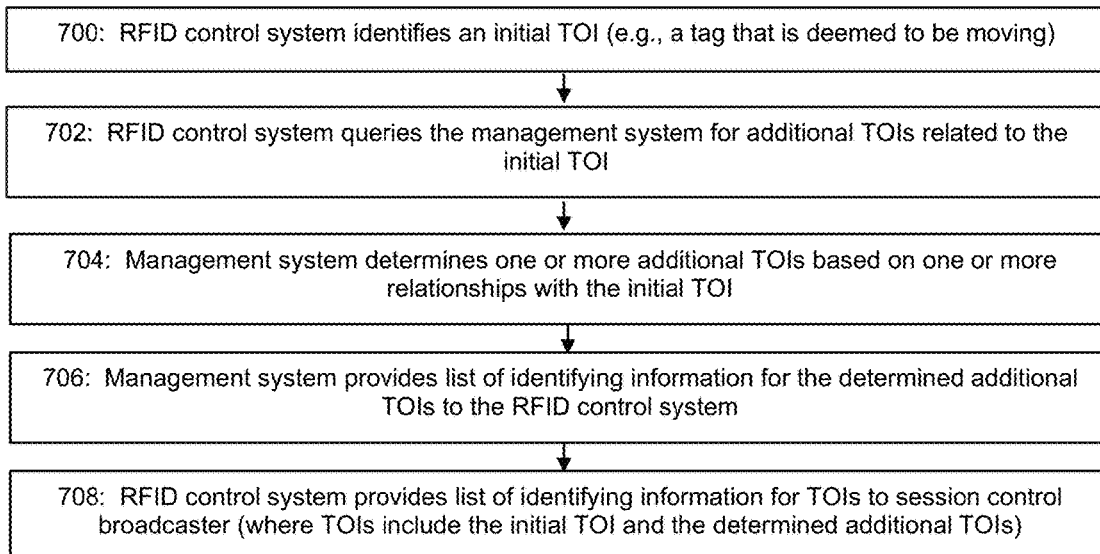
FIG. 7A depicts an example process flow for coordinated operations by an RFID control system and a management system to determine RFID tags of interest.
Figure 7B:
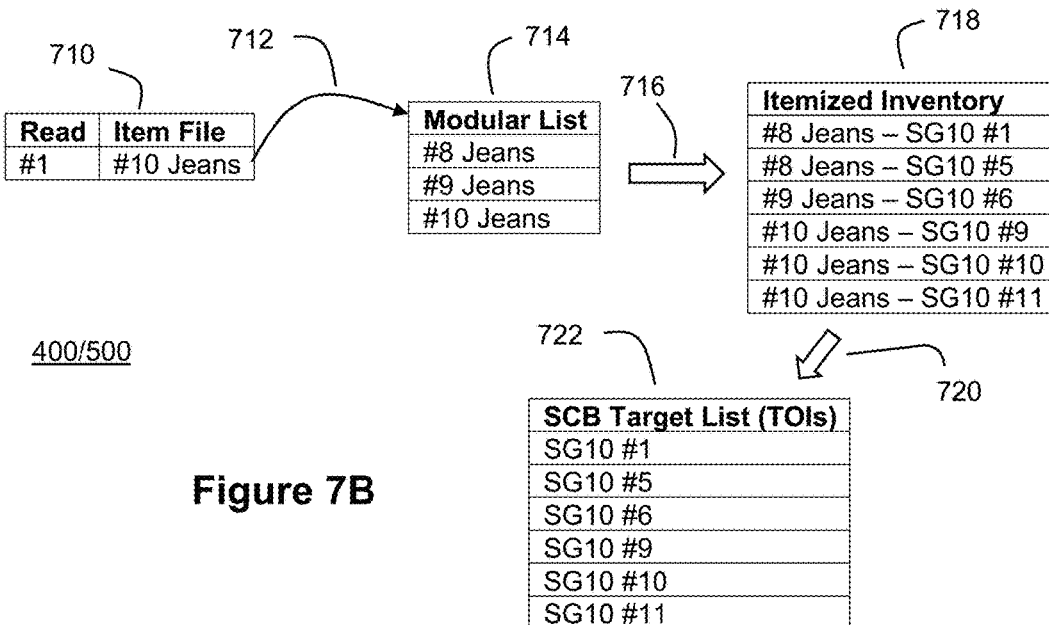
FIG. 7B depicts an example of how relational data about inventory items can be used to determine RFID tags of interest in response to a read RFID tag.

FIGS. 7A and 7B show an example of how steps 400/500 from FIGS. 4 and 5 can be carried out by RFID control system 602 in coordination with management system 604 to identify TOIs.

For example, step 700 of FIG. 7A shows that the RFID control system 602 can be configured to detect an initial TOI based on criteria such as criteria that indicates a given tag 106 is moving. The RFID control system 602 can then communicate with the management system 604 via communication link 630 to notify the management system 604 about the initial TOI, whereupon the management system 604 determines additional TOIs that are related in some fashion to the initial TOI. For example, at step 702, the RFID control system 602 can query the management system 604 for additional TOIs that are related to the initial TOI. At step 704, the management system 604 determines one or more additional TOIs based on one more relationships with the initial TOI (e.g., which tags have specified relationships with a moving tag as reflected in database(s) 126?). At step 706, the management system 604 provides a list of partial identification information for these additional TOIs (such as masks for RFID tag identifiers for these additional TOIs, e.g., the SKU/UPC/G10 portion of the RFID tag identifiers) to the RFID control system 602 via communication link 630. However, it should be understood that this list may include full RFID tag identifiers if such information is available in the management system 604. At step 708, the RFID control system 602 provides a list of TOIs to the session control broadcaster 104 for the generation of suitable session control messages 112. This list provided at step 708 can include the initial TOI (e.g., the moving tag) and the additional TOIs found as a result of step 704.

FIG. 7B shows a running example of the FIG. 7A process flow in a retail store scenario. With the example of FIG. 7B, we will assume that the system 100 is deployed in a retail store where some of the items for sale include clothing such as jeans. A read event can result in the RFID control system 602 detecting an RFID tag identifier for a tag 106 that has been moved or otherwise interacted with by a customer or employee. The RFID control system 602 can then query the management system 604 based on this moving tag. For example, the RFID control system 602 can provide at least a portion of the detected RFID tag identifier (such as the SKU/UPC/G10 portion) to management system 604 as an item file 710 for the item corresponding to the RFID tag identifier from the read event. The item file 710 can identify that the tag 106 for the read event is linked to particular type of item (e.g., a pair of #10 jeans).

It should be understood that the qualifier #10 for the jeans is merely meant to serve as a general attribute of the item that can help define a class of the item. For example, #10 could be a reference to a particular brand of jeans, color of jeans, and/or size of jeans. Many retail stores will use a standardized convention whereby the class of product to which an item belongs is referred to as a SKU, UPC, or G10 number (identifier), where different types/classes of products will have different SKU, UPC, or G10 identifiers. Thus, the #10 qualifier can be a particular SKU, UPC, G10, or other identifier for one or more attributes of an item.

The management system 604 can interact with the database(s) 626 (see 712) to determine what other types of items are displayed in the store nearby this type of jeans. The management system 604 can determine what qualifies as "nearby" based on any of a number of defined criteria. For example, the database(s) 626 may associate items with other nearby items based on an attribute such as a modular or the like (where items associated with the same modular are intended to be displayed nearby each other in a store). As another example, if the database(s) 626 identifies a location for an item that is within a defined threshold distance of a subject item, then that item can be deemed near/nearby the subject item. The units of measurement for the threshold distance can be any quantity generally indicative of distance. For example, if a group of items are displayed on the same shelf (or within X shelves) in a store (or in the same column of shelves (or within X columns of shelves) in a store) according to a store's product layout mapping (e.g., a planogram or modular), this can be the basis by which the management system 604 decides which items are "nearby". This operation 712 can yield a modular list 714 that identifies one or more other types of items that are displayed near the subject product from item file 710. In this example, list 714 can identify that the #10 jeans are displayed near #8 jeans and #9 jeans. The management system 604 can then communicate list 714 to the RFID control system 602 for the RFID control system 602 to perform further lookups in its database(s) 616 (see 716) to identify the RFID tag identifiers for the particular inventory items in the retail store for these types of items. These lookups 716 can yield an itemized inventory list 718 that identifies the RFID tag identifiers for the RFID tags 106 associated with specific items of inventory that are members of the types/classes of items from list 714. In an example embodiment where the types/classes can be referred to as G10 information, it should be understood that the RFID tag identifiers in list 718 can be EPCs or SGTINs/SG10s that uniquely identify individual instances of items belonging to a particular class/type (G10). For example, the management system 604 can provide a list of G10s to the RFID control system 602, and the RFID control system 602 can determine a list of SG10s based on this G10 information. Thus, list 718 can identify all of the specific items of inventory that are generally meant to be displayed in a store near the subject item of the item file 710.

The RFID control system 602 can process the itemized inventory list 718 (see step 720) to generate a target list of TOIs (see 722). This list of determined TOIs can comprise the identifying information for the RFID tags 106 identified by item file 710 and list 718 (such as full or partial RFID tag identifiers (e.g., SG10 identifiers) for these tags). Accordingly, the RFID control system 602 can provide this list to the session control broadcaster 104, whereupon the session control broadcaster 104 generates and wirelessly transmits session control messages 112 that are targeted to the RFID tags 106 corresponding to the RFID tag identifier information from list 722 (see steps 502, 504, 506, and 508 in FIG. 5). In this fashion, the system 100 can force the TOIs from list 722 into a readable session state so that the RFID reader 102 can interrogate them and determine their presence.

It should be understood that FIG. 7B is just an example of how TOIs can be determined by the control system 120 according to defined criteria at steps 400/500. Practitioners may find other approaches to determining which tags 106 qualify as TOIs desirable. For example, a practitioner may find it desirable to use criteria other than nearness to determine additional TOIs. As an example, like kind items may be displayed in locations of a store that may be far from the item's normal modular and could be positioned in various kiosks, point of sale locations, end caps, and the like that are remote from the item's normal modular. As such, the management system 604 may use criteria such as data indicating that particular items are like kind items or often bought together to determine that the tags linked to items that are like kind items or are often purchased together qualify as TOIs. The database(s) 126 may include attributes for subject items that identify which other items are associated with the subject items as "like kind" items and/or items that are frequently bought together with the subject items to permit efficient lookup and retrieval of additional TOIs at step 704. As another example, if management system 604 maintains data indicative of customer purchase preferences (such as profile data for particular customers), the system 100 can detect the customer's presence in a store (such as by detecting the presence of a mobile device associated with the customer), and then access the customer's purchasing profile to determine the items that a customer often buys. The tags 106 corresponding to such items can be flagged as TOIs by the management system 604.

The approach to managing the readability of tags 106 as exemplified by FIGS. 7A and 7B provides the system 100 with much greater visibility into salient tag activity relative to conventional approaches to RFID systems because conventional RFID systems will either have too many tags in a readable state (in which case the conventional RFID system is overwhelmed with "noise" and cannot find the "signal") or have too many tags in an unreadable state (in which case the conventional RFID system is not aware of tags that might be moving into a customer's cart, moving into an "out of place" location, or moving out of a store altogether).

Furthermore, with reference to the example of FIGS. 7A and 7B, it can be seen that it may be the case that the TOIs can include RFID tag identifiers for RFID tags 106 attached to the same or similar class of item that was the subject of item file 710 (or other triggering activity for the system 100). In example embodiments, the RFID tag identifiers can be assigned to items so that portions of the RFID tag identifiers encode information about the classes to which the items belong. For example, the most significant bits (MSBs) of an RFID tag identifier for a subject item may encode a class to which the subject item belongs, while the least significant bits (LSBs) serve as unique serial numbers for a particular item instance within that class. Continuing with an example where the RFID tag identifiers are SG10s, this can mean that the MSBs of the RFID tag identifier encode the G10 information while the LSBs provide the serialization that uniquely defines the SG10 for the subject item. Such encoding can be defined as part of a standardized format for RFID tag identifiers.

Figure 8:
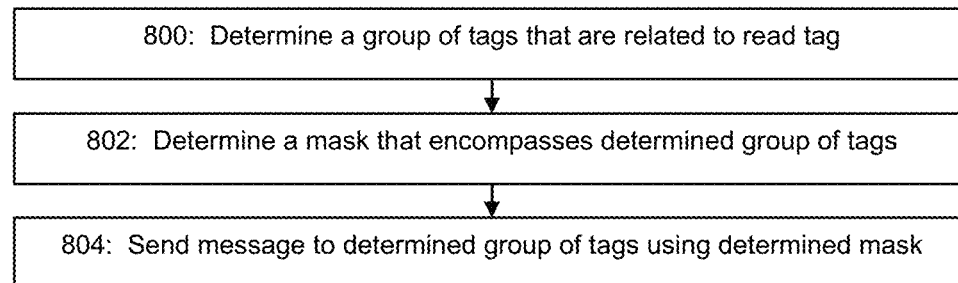
FIG. 8 depicts an example process flow where a mask is used to target a session control message to a group of RFID tags.

The system 100 can leverage such formatting to improve the efficiency of session control message transmissions by the session control broadcaster 104 by permitting the session control messages 112 to be multicast for operative reception by multiple RFID tags 106. That is, the same session control message 112 can be targeted to multiple TOIs. FIG. 8 depicts an example process flow for supporting such multicasting. At step 800, a processor determines a group of tags that are related to a tag that has been the subject of a read event. As indicated in connection with FIG. 7B, this group of tags can be determined based on the tags' memberships in a class to which the subject read tag belongs. At step 802, a processor determines a mask that encompasses the determined group of tags from step 800. For example, we can presume for purposes of explanation that the hypothetical SG10s are 6-bits long. If the subject read tag belongs to a G10 of "111", and if the SG10s for the tags 106 are formatted so that the first 3 bits encode the G10 information while the final 3 bits encode the unique serial number information for a subject item (e.g., the RFID tag identifiers of "111000", "111001", "111010", . . . "111111" serve as SG10s for the RFID tags 106 applicable to items that belong to the G10 class of 111), this means that a mask of "111***" (where the asterisks represent "don't care" bits or the like) could be used for encompassing a group of tags 106 that are related to the subject read tag. At step 804, the session control broadcaster 104 can use this mask to generate and send a session control message 112 that would be operatively received by the tags 106 within range of the session control broadcaster 104 whose RFID tag identifiers are encompassed by the mask. It should be understood that this is a simple example. In many instances, the RFID tag identifiers will have many more bits (e.g., 96 bits), and different bit groups within the multi-bit sequence can encode a variety of attributes of an item (e.g., item type, vendor, etc.). The session control messages 112 can use masks to target any of these attributes.

Moreover, in an example embodiment where the TOIs are identified by a mask in the session control messages 112, it may be the case that the system 100 is able to learn which tag (or tags) in the group of tags 106 encompassed by the mask is moving (and which tags are not moving). The control system 120 can leverage this information to update the list of TOIs so that the moving tags are identified by their full RFID tag identifiers while the non-moving tags are removed from the TOI list such as by removing the mask for the subject group from the TOI list. This is effective to cause the session control broadcaster 104 to transmit session control messages 112 to the tag(s) identified by the full RFID tag identifier(s) while no longer transmitting session control messages 112 to the stationary tags within the group of tags that had been identified by the mask. Moreover, it should be understood that the entries on the list may encompass at least one RFID tag in common. This could arise where the list includes an Entry j that is Mask 1 and an Entry k that is a full RFID tag identifier, where Mask 1 encompasses the full RFID tag identifier. In this circumstance, the session control broadcaster can generate different session control messages targeting Mask 1 and the full RFID tag identifier, which would result in the RFID tag identified by the full RFID tag identifier being targeted with both session control messages. This could also arise where the list includes an Entry j that is Mask 1 and an Entry k that is Mask 2, where Masks 1 and 2 both encompass at least one RFID tag in common.

In an example embodiment, steps 800 and 802 can be performed by one or more processors 122 within the control system 120. However, this need not necessarily be the case. For example, steps 800 and 802 could alternatively be performed by one or more processors resident in the session control broadcaster 104 if desired by a practitioner.

Figure 9A:
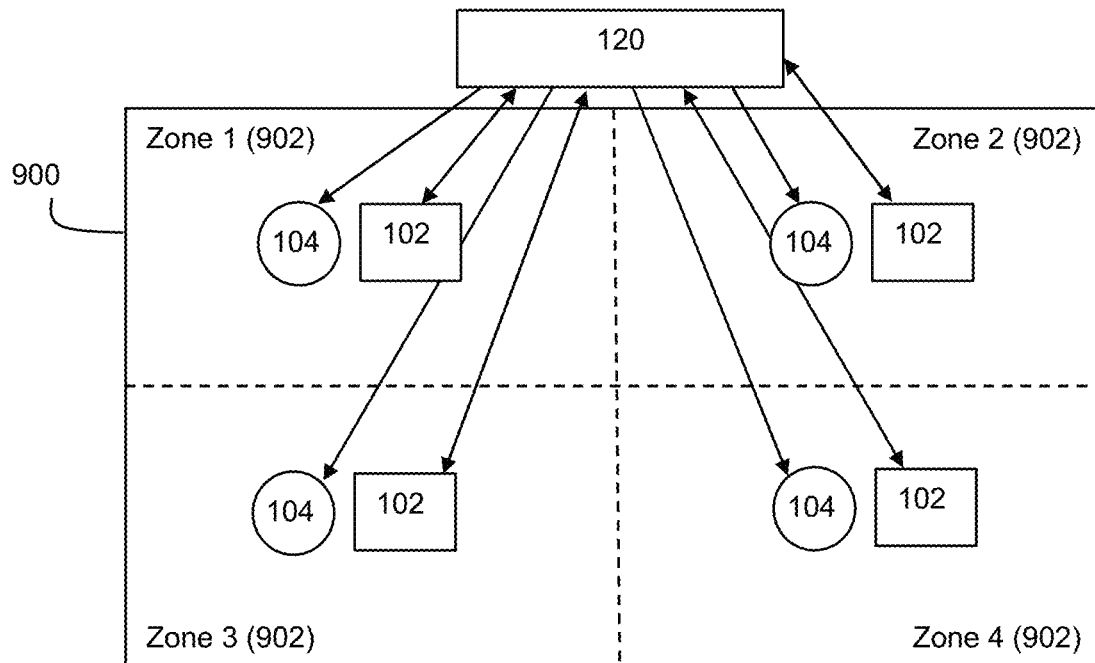
FIGS. 9A and 9B depict example RFID systems that employ multiple session control broadcasters and RFID readers to perform operations in multiple zones of a coverage area.

FIG. 9A depicts an example RFID system where a coverage area 900 (such as the premises of a warehouse or retail store) includes multiple RFID readers 102 and session control broadcasters 104. The coverage area 900 can be subdivided into different coverage zones 902, and each zone 902 can have its own RFID reader 102 so that a plurality of the RFID readers 102 are in a spaced arrangement relative to each other. Moreover, each zone 902 can also have its own session control broadcaster 104 if desired so that a plurality of the session control broadcasters 104 are in a spaced arrangement relative each other. However, it should be understood that in some situations, a practitioner may find it sufficient to employ a single session control broadcaster 104 that covers multiple zones 902 or even the full coverage area 900 (such as in scenarios where the coverage area 900 is sufficiently small to allow a single session control broadcaster 104 to broadcast to tags 106 throughout the coverage area 900). Further still, in an example embodiment where the session control broadcaster 104 has multiple antennas that cover different areas, different antennas of the session control broadcaster 104 could be used to broadcast to different zones 902 if desired by a practitioner.

The RFID readers 102 (and session control broadcasters 104 as applicable) can be calibrated and/or positioned so that their RF signals are operative within their respective zones 902 but not operative (or at least minimally operative) outside their respective zones 902. Moreover, for some example embodiments, it is believed that offloading session control tasks from RFID readers 102 will empower a practitioner to use wider spacings of RFID readers 102 within a coverage area 900 (i.e., use larger zones 902) than would be used with conventional RFID systems because the wider spacing is expected to produce a larger population of hidden tags than a closer spacing. Unlike conventional RFID systems where hidden tags are a problem to be eliminated by removing null spots wherever possible, with example embodiments described herein, the existence of null spots is a desirable feature that allows for the use of hidden tag detection as a mechanism for detecting tags that are likely to be moving; and the use of a wider spacing of RFID readers 102 in coverage area 900 is likely to produce more null spots and thus more hidden tags than a tight spacing of RFID readers 102.

Moreover, the RFID readers 102 and session control broadcasters 104 can be positioned and calibrated so that their respective zones 902 are substantially the same (that is, a first coverage zone 902 for a first RFID reader 102 can be substantially the same as a first coverage zone 902 for a first session control broadcaster 104, as shown by FIG. 9A). For example, a practitioner might deploy a session control broadcaster 104 for a particular zone 902 just below (or above) the RFID reader 102 for that particular zone 902. But it should be understood that this need not be the case as the session control broadcasters 104 could be laterally spaced from RFID readers 102 if desired. By employing zones 902, the population of RFID tags 106 that a particular RFID reader 102 will be responsible for can be reduced, which helps load balance the system.

Furthermore, in example embodiments where one or more RFID readers 102 have multiple antennas and/or where one of more session control broadcasters 104 have multiple antennas, each antenna can define its own corresponding zone 902 as a function of the geographic extent that can be reached via the RF signals transmitted by such antennas.

Figure 9B:
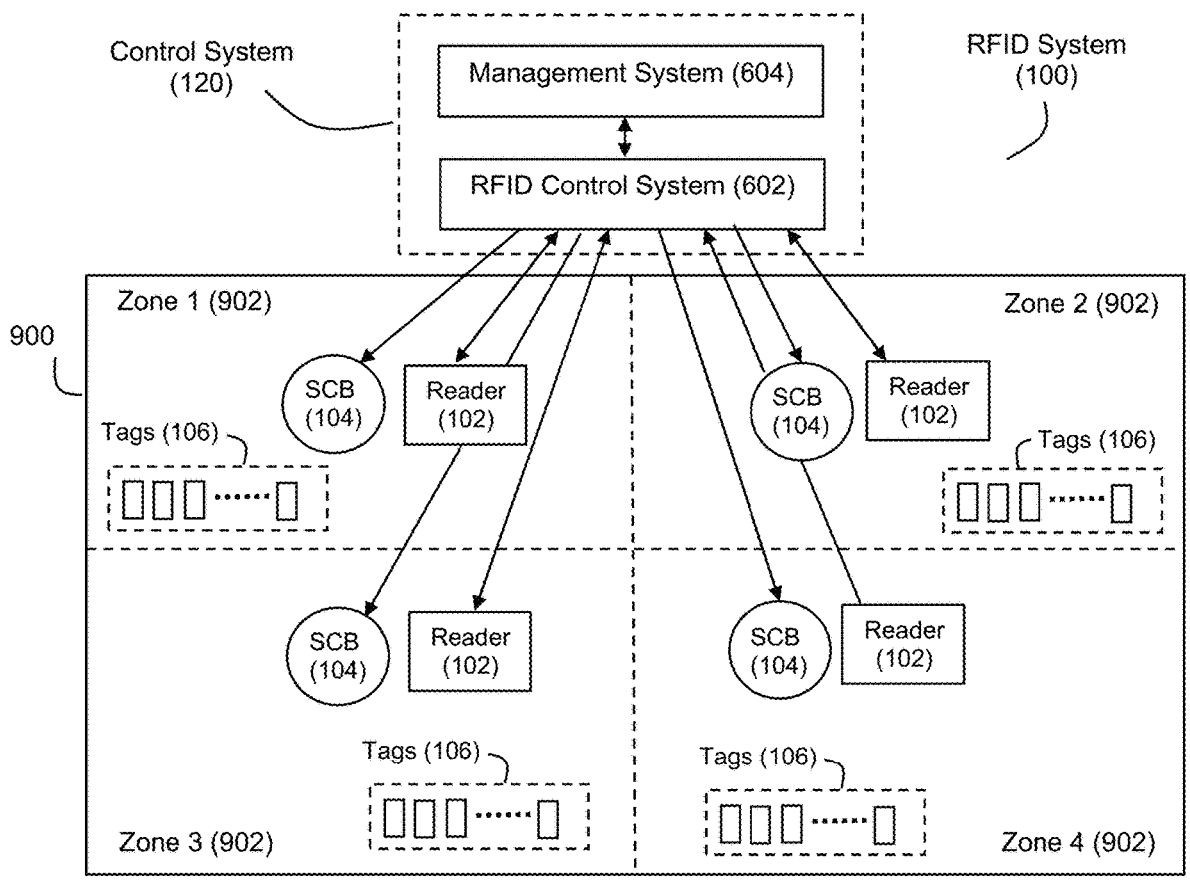

FIG. 9B shows a further example of the architecture of FIG. 9A where the control system 120 includes the RFID control system 602 and management system 604 as discussed above.

In an example embodiment, one or more of the zones 902 can be a fixed zone defined by locating the RFID reader 102 and/or session control broadcaster 104 for that fixed zone in a fixed location. However, it should be understood that a practitioner may choose to employ one or more RFID readers 102 and/or session control broadcasters 104 that are mobile so that their coverage zones 902 may change over time.

Control system 120 can communicate with each RFID reader 102 and session control broadcaster 104 as discussed above. However, it should be noted that the database(s) 126 can also associate the tags 106 with the zones 902 in which the tags are positioned. For example, if the item layout map for coverage area 900 specifies that Item X is to be located in a location that is encompassed by Zone 1, then the database(s) 126 can associate information relating to the RFID tag identifier for Item X with Zone 1 (in which case Zone 1 can serve as the "normal" or "expected" zone for Item X). Moreover, each RFID reader 102 and session control broadcaster 104 can be associated in database(s) 126 with the zones 902 in which they are located. In this fashion, the control system 120 can determine when a tag 106 may be out of place because it is detected by an RFID reader 102 in a zone outside its normal/expected zone. Such a tag 106 that is detected as being "out of place" can be classified as a TOI at steps 400/500 if desired by a practitioner. Tags 106 may be "out of place" for any of a number of reasons, including but not limited to a customer putting the item linked to the subject tag 106 in his or her shopping cart and moving to another zone 902 of the coverage area 900, an item linked to the subject tag 106 being misplaced by a customer or employee in another zone 902 of the coverage area 900, etc.

Moreover, the control system 120 can use the zone information to make decisions about which session control broadcaster(s) 104 should be used to communicate session control messages 112 to a TOI. An example process flow in this regard is shown by FIG. 10.

Figure 10:
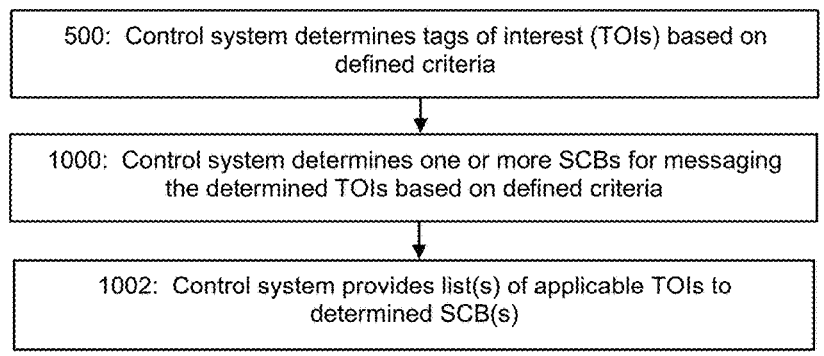
FIG. 10 depicts an example process flow where a control system determines which session control broadcasters within an RFID system are to be used to communicate session control messages to RFID tags of interest.

At step 500 of FIG. 10, the control system 120 determines the TOIs based on defined criteria as noted above.

At step 1000, the control system 120 determines one or more session control broadcasters 104 for messaging the determined TOIs based on additional defined criteria. For example, in some embodiments, a practitioner may want all of the session control broadcasters 104 in the coverage area 900 to send session control messages 112 to the determined TOIs so that the determined TOIs can have their session states reliably controlled. In this case, the defined criteria employed by step 1000 would cause the control system 120 to select all of the session control broadcasters 104 for messaging the determined TOIs. However, in other embodiments, a practitioner may want to limit the scope of transmitted session control messages 112 for one or more of the determined TOIs. For example, a practitioner may want to limit the session control message 112 to a particular zone 902 or subset of zones 902 within the coverage area 900 by routing a request to message a particular RFID tag 106 to a particular session control broadcaster 104 (or group of session control broadcasters 104). As an example, if the triggering event for a TOI determination at step 1000 was that a related tag 106 was detected in Zone 1, a practitioner may find it desirable to limit the session control message 112 for that particular TOI to only Zone 1. Moreover, if the particular TOI has a normal/expected zone according to database(s) 126 that is different than Zone 1, a practitioner may find it desirable to also include the normal/expected zone so that the session control broadcaster 104 in that normal/expected zone also transmits the session control message to the particular TOI. Further still, in an example where the control system 120 draws a conclusion that a TOI may be currently moving (e.g., located in a customer's shopping cart or the like), the control system 120 may predict the zone or zones into which the TOI will likely be traveling; and the control system 120 can select session control broadcasters 104 that are located in such zone(s).

At step 1002, the control system 120 provides each session control broadcaster 104 determined at step 1000 with a list of the applicable TOIs for that session control broadcaster 104. In this fashion, the control system 120 can tailor the geographic scope of transmitted session control messages 112 to particular zones 902 within the coverage area 900.

Furthermore, it should be understood that the zoned RFID readers 102 can be used in coordination with the one or more session control broadcasters 104 to generate and refine estimates regarding which tags 106 are likely moving and which tags are likely stationary. To accomplish this, the control system 120 can operate on a time series of RFID tag read data generated by different RFID readers 104 in the system 100. Tags 106 which show movement across zones 902 in the time series can be deemed moving, while tags that do not show movement across zones 902 in the time series can be deemed stationary. Thus, while a process flow such as that described in connection with FIGS. 7A and 7B might find a relatively large set of tags 106 qualify as TOIs because one or more of these TOIs are deemed to be moving and other ones of these TOIs have some specified relationship with the moving TOI(s), subsequent data within the time series may show that a subset of these TOIs are not moving, which may cause such tags 106 to no longer qualify as TOIs for subsequent transmissions of session control messages 112.

FIGS. 11A-11E show various example embodiments for the RFID reader 102 and session control broadcaster 104.

Figure 11A:
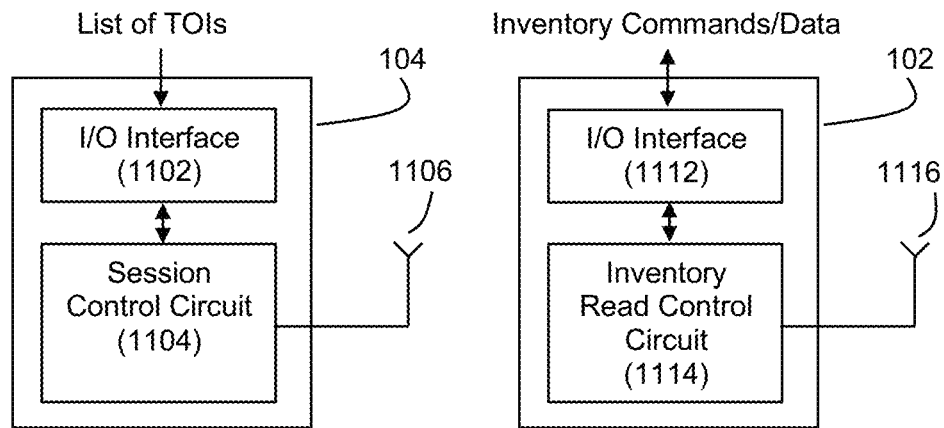
FIG. 11A depicts an example where the session control broadcaster and RFID reader are each deployed as separate devices with their own RF antennas.

In the example of FIG. 11A, the RFID reader 102 and session control broadcaster 104 are each deployed as their own discrete units. For example, the RFID reader 102 and session control broadcaster 104 can be deployed on different circuit boards within different housings.

The session control broadcaster 104 of FIG. 11A can comprise an input/output (I/O) interface circuit 1102 and a session control circuit 1104. The I/O interface circuit 1102 can provide connectivity with remote system components such as the control system 120 so that the session control broadcaster 104 can receive a list of TOIs via communication link 130. Session control circuit 1104 can be arranged to translate the list of TOIs received from the control system 120 into RF signals that serve as session control messages 112. In this regard, the session control circuit 1104 may include a processor or other compute resource that extracts the RFID tag identifier information for the TOIs and formats this information into a suitable session control message. The session control circuit 1104 can also include a non-transitory computer-readable storage medium (e.g., memory) that stores code/instructions for execution by the processor. Further still, the session control circuit 1104 can include a modulation circuit that encodes the session control messages onto RF signals that serve as the transmission mechanism for the session control messages 112. The session control circuit 1104 can be operatively connected to an antenna 1106 that serves as a wireless transmitter for transmitting these RF signals.

The RFID reader 102 of FIG. 11A can comprise an input/output (I/O) interface circuit 1112 and an inventory read control circuit 1114. The I/O interface circuit 1112 can provide connectivity with remote system components such as the control system 120 so that the RFID reader 102 can receive commands from the control system 120 and provide data to the control system 120 communication link 128. Inventory read control circuit 1114 can be arranged to translate commands from the control system 120 to initiate sequences of RF signals that serve as read request messages 108. Moreover, the inventory read control circuit 1114 can be arranged to perform operations such as generating RF signals that serve as inventory read request messages 108 in response to commands from the control system 120, processing response messages 110 from RFID tags 106 to extract information such as RFID tag identifiers from them, and assembling this extracted information for communication to the control system 120. In this regard, the inventory read control circuit 1114 may include a processor or other compute resource that performs many of these operations, a non-transitory computer-readable storage medium (e.g., memory) that stores the code/instructions for execution by the processor, a modulation circuit to create the RF signals that serve as the read request messages 108, and a demodulation circuit that extracts the response messages 110 from the RF signals generated by the RFID tags 106. The inventory read control circuit 1114 can be operatively connected to an antenna 1116 that serves as a wireless transceiver for transmitting and receiving these RF signals.

Figure 11B:
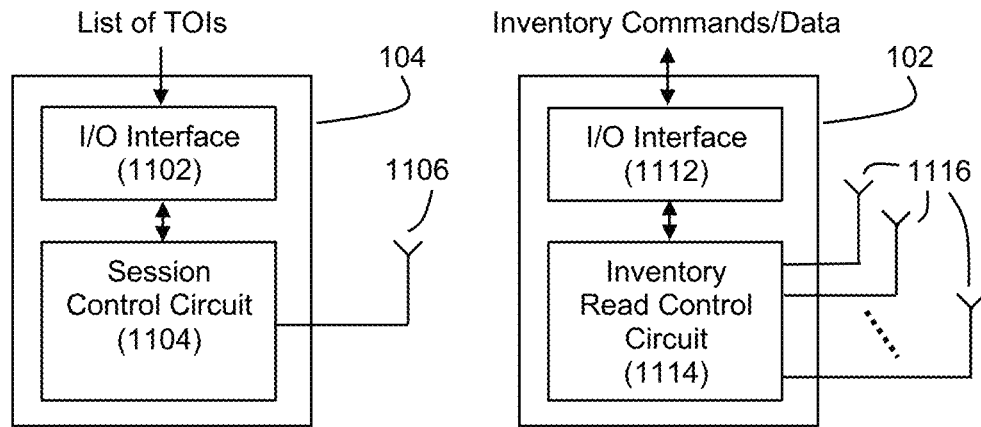
FIG. 11B depicts an example where the session control broadcaster and RFID reader are each deployed as separate devices with their own RF antennas, and where the RFID reader employs an array of RF antennas.

FIG. 11B depicts another example where the RFID reader 102 and session control broadcaster 104 are their own discrete units. In the example of FIG. 11B, the RFID reader 102 includes an array of antennas 1116. This antenna array can provide the RFID reader 102 with better coverage of its applicable coverage zone. For example, the array can be a phased array of antennas that are arranged to spatially cover a wide field. In a scenario where the RFID reader 102 is employed as fixed infrastructure within a premises such as by locating the RFID reader 102 in a ceiling of the premises, the phased array of antennas 1116 can be arranged to provide many degrees of coverage (up to 360 degrees of coverage) around the RFID reader 102 looking down from its position in the ceiling.

Moreover, while FIGS. 11A and 11B show a single antenna 1106 for the session control broadcaster 104, it should be understood that the session control broadcaster 104 may also employ multiple antennas 1106 (such as a phased array of antennas 1106) if desired to provide suitable coverage for the session control broadcaster 104.

Figure 11C:
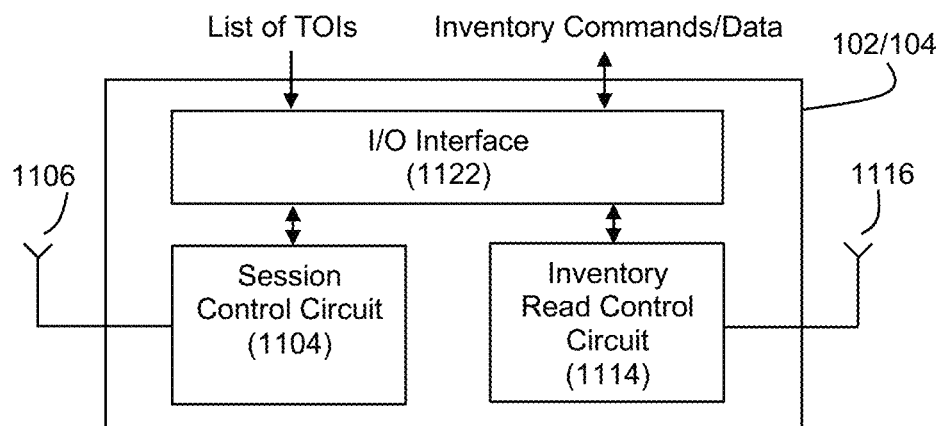
FIG. 11C depicts an example where the session control broadcaster and RFID reader are deployed as a single integrated device, where the session control and inventory read operations each employ their own RF antennas.

FIG. 11C shows an example where the RFID reader 102 and session control broadcaster 104 are integrated together in a common housing. In this example, the session control circuit 1114 and inventory read control circuit 1114 can each be connected to their own antennas 1106 and 1116 respectively; but they can share a common I/O interface circuit 1122 through which they can communicate with remote system components such as the control system 120. However, if desired by a practitioner, the session control broadcaster 104 and RFID reader 102 can each employ their own separate, unshared components, but still be deployed in a common housing for ease of installation.

Figure 11D:
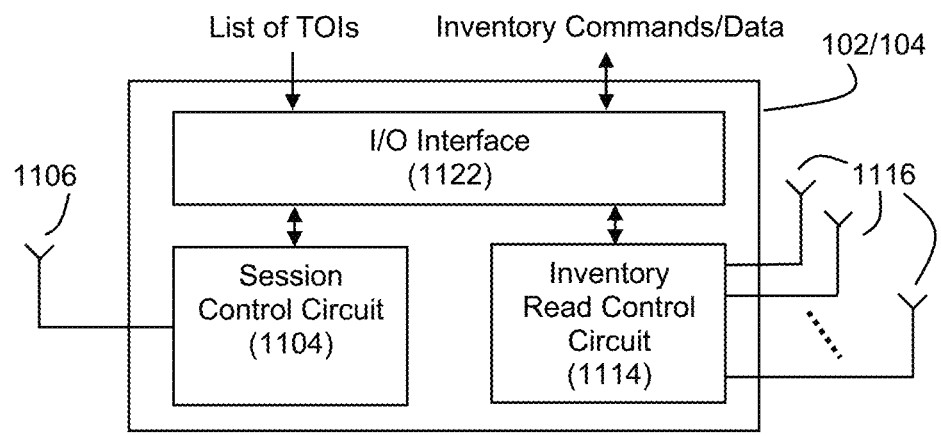
FIG. 11D depicts an example where the session control broadcaster and RFID reader are deployed as a single integrated device, where the session control and inventory read operations each employ their own RF antennas, and where the RFID reader employs an array of RF antennas.

FIG. 11D shows a variation of the FIG. 11C embodiment where the session control circuit 1104 and inventory read control circuit 1114 share a common I/O interface circuit 1122 and where the inventory read control circuit 1114 is connected to an array of antennas 1116 as shown in connection with FIG. 11B. Once again, it should be understood that the session control circuit 1104 can also be connected to an array of antennas 1106 if desired by a practitioner.

Figure 11E:
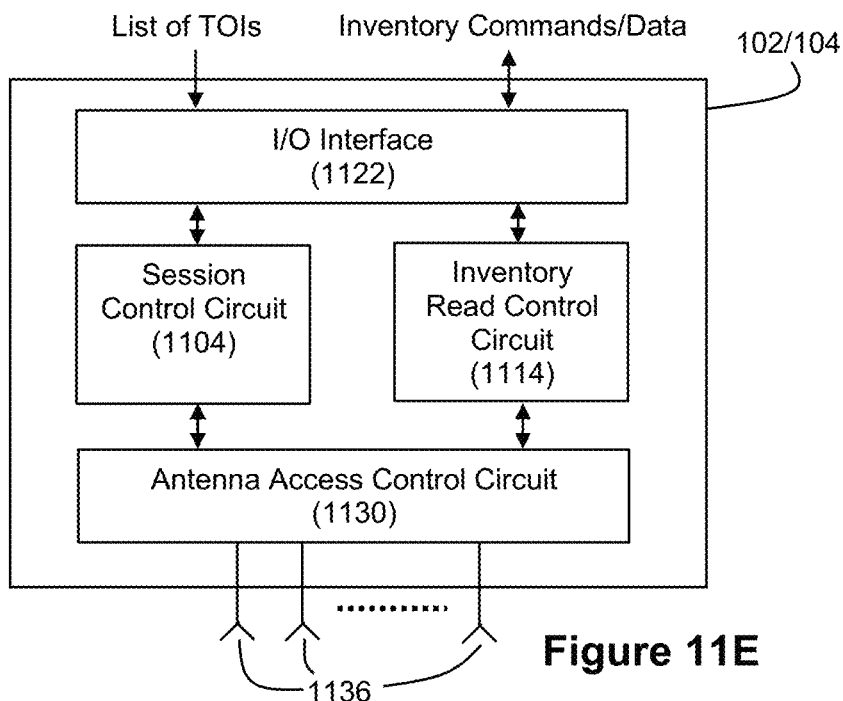
FIG. 11E depicts an example where the session control broadcaster and RFID reader are deployed as a single integrated device, where the session control and inventory read operations each share access to an array of RF antennas.

FIG. 11E shows an example where the session control circuit 1104 and inventory read control circuit 1114 share access to both the I/O interface circuit 1122 and an array of antennas 1136. To facilitate the sharing of antennas 1136, the unit of FIG. 11E includes an antenna access control circuit 1130 which controls access to the antennas 1136 by the session control circuit 1104 and inventory read control circuit 1114. For example, the antenna access control circuit 1130 can be configured to provide the session control circuit 1104 with access to an antenna among the antennas 1136 that is unused by the inventory read control circuit 1114 at the relevant time. Thus, it should be understood that the antenna access control circuit 1130 can change which of the antennas 1136 that the session control circuit 1104 is using to transmit session control messages 112 over time. Further still, in a variation on the example of FIG. 11E, the session control circuit 1104 and inventory read control circuit 1114 can each access their own corresponding I/O interface circuits 1102 and 1112 if desired by a practitioner while still sharing access to the antennas 1136 via antenna access control circuit 1130.

While the invention has been described above in relation to its example embodiments, various modifications may be made thereto that still fall within the invention's scope. For example, the foregoing specification is rich with examples and explanations relating to the retail industry. However, it will be apparent to one skilled in the art that the principles described herein, including but not limited to features whereby an RFID system manages a population of RFID tags to focus its read operations on tags of interest (such as moving tags and tags related to moving tags) has applicability outside of the retail industry and can be employed in fields that include but are not limited to health care, defense/military, aerospace, transportation, manufacturing, etc., where there are needs to apply technology in a manner that tracks items and updates records about items in the physical world.

These and other modifications to the invention will be recognizable upon review of the teachings herein.

What is claimed is:

1. A system for controlling and communicating with a plurality of radio frequency identification (RFID) tags, wherein each RFID tag has an associated RFID tag identifier and is controllably switchable between a readable session state and an unreadable session state, the system comprising:
   a control system that determines which of the RFID tags qualify as tags of interest (TOIs) based on defined criteria, wherein the defined criteria include one or more criteria that indicate an RFID tag is missing, wherein the missing RFID tag serves as a TOI;
   a session control broadcaster that (1) generates session control messages for the determined TOIs and (2) wirelessly communicates the session control messages for reception by the determined TOIs, wherein the session control messages are targeted to the determined TOIs based on RFID tag identifier information for the determined TOIs, and wherein the session control messages are operable to control whether the determined TOIs that receive the session control messages are in the readable session state or the unreadable session state; and
   an RFID reader that (1) generates read request messages and (2) wirelessly communicates the read request messages for reception by one or more of the RFID tags that are in the readable session state; and
   wherein the one or more criteria that indicate an RFID tag is missing comprises data which indicates that RFID tag has not been read by the RFID reader within a defined time threshold, and wherein the defined time threshold is based on (1) an expected inventory turn time for an item linked with that RFID tag or (2) an expected intake turn time for the item linked with that RFID tag.

2. The system of claim 1 wherein the defined time threshold is based on the expected inventory turn time for the item linked with that RFID tag.

3. The system of claim 1 wherein the defined time threshold is based on the expected intake turn time for the item linked with that RFID tag.

4. The system of claim 1 wherein the defined criteria further include one or more additional criteria that associate one or more additional RFID tags with the missing RFID tag, wherein the one or more additional RFID tags also serve as TOIs.

5. The system of claim 4 wherein the one or more additional criteria comprise one or more attributes that are shared between the missing RFID tag and the one or more additional RFID tags.

6. The system of claim 1 further comprising a plurality of session control broadcasters and a plurality of RFID readers that are arranged to cover different zones within a coverage area for the system.

7. The system of claim 1 further comprising a plurality of RFID readers that cover a plurality of zones within an area; and
   wherein the control system refines estimates regarding which of the RFID tags qualify as TOIs based on an analysis of a time series of RFID tag read data from a plurality of the RFID readers.

8. The system of claim 1 wherein the session control messages are operable to control the select RFID tags to be in the readable session state.

9. The system of claim 1 wherein the session control broadcaster and the RFID reader are configured for operating concurrently with each other.

10. The system of claim 1 wherein the RFID reader and session control broadcaster perform their recited operations in Session 2 or Session 3 according to EPC GEN2.

11. The system of claim 1 wherein the session control broadcaster wirelessly communicates the session control messages via a first wireless transmitter, and wherein the RFID reader wirelessly communicates the read request messages via a second wireless transmitter.

12. The system of claim 1 wherein the RFID reader (1) receives responses from the RFID tags which receive the read request messages while in the readable session state and (2) communicates data representative of the received responses to the control system.

13. The system of claim 12 wherein the control system updates a database based on the communicated data representative of the received responses.

14. The system of claim 1 wherein the session control broadcaster and the RFID reader are (1) separate units in different housings or (2) located in a common housing.

15. The system of claim 1 wherein the control system communicates information about the RFID tag identifiers that are associated with the determined TOIs to the session control broadcaster; and
   wherein the session control broadcaster generates the session control messages based on the communicated information.

16. The system of claim 15 wherein the communicated information comprises a partial RFID tag identifier or a full RFID tag identifier for an applicable determined TOI.

17. The system of claim 1 wherein the control system includes a processor and a database, wherein the database associates a plurality of the RFID tags with a plurality of additional ones of the RFID tags based on a plurality of attributes, and wherein the processor (1) processes data indicative of a read RFID tag and (2) interacts with the database to identify one or more additional RFID tags that are associated with the read RFID tag based on one or more of the attributes, wherein the determined TOIs include the identified one or more additional RFID tags.

18. The system of claim 17 wherein a plurality of the RFID tags are associated with a plurality of different items, wherein the attributes include attributes that indicate different items as being physically located as a plurality of different groups of items, and wherein the identified one or more additional RFID tags are identified by the processor according to the attributes as belonging to the same group of items as the read RFID tag.

19. The system of claim 18 wherein the items include (1) products with attached or embedded RFID tags that are on display in display areas of a retail store and/or in storage in a storage area of a retail store and/or (2) items with attached or embedded RFID tags in a warehouse.

20. The system of claim 1 wherein the control system comprises an RFID control system.

21. The system of claim 20 wherein the control system further comprises a management system.

22. The system of claim 1 wherein the readable session state comprises an A state according to an Electronic Product Code (EPC) RFID protocol, and wherein the unreadable session state comprises a B state according to the EPC RFID protocol.

23. The system of claim 1 wherein the RFID tag identifier information comprises at least one partial RFID tag identifier and/or at least one full RFID tag identifier.

24. The system of claim 1 wherein the session control messages comprise select commands that command the determined TOIs to exhibit a readable state, and wherein the read request messages comprise query commands for inventory rounds.

25. A system for controlling and communicating with a plurality of radio frequency identification (RFID) tags, wherein each RFID tag has an associated RFID tag identifier and is controllably switchable between a readable state and an unreadable state, the system comprising:
  a control system that determines which of the RFID tags qualify as tags of interest (TOIs) based on defined criteria, wherein the defined criteria include one or more criteria that indicate an RFID tag is missing, wherein the missing RFID tag serves as a TOI;
  an RFID transmitter that transmits first radio frequency (RF) signals, wherein the first RF signals encode messages that are targeted to the determined TOIs and configured to control whether the determined TOIs are in a readable state; and
  an RFID reader that transmits second RF signals, wherein the second RF signals encode messages that interrogate RFID tags in a readable state for their presence; and
  wherein the one or more criteria that indicate an RFID tag is missing comprises data which indicates that RFID tag has not been read by the RFID reader within a defined time threshold, and wherein the defined time threshold is based on (1) an expected inventory turn time for an item linked with that RFID tag or (2) an expected intake turn time for the item linked with that RFID tag.

26. A system for controlling and communicating with a plurality of radio frequency identification (RFID) tags, wherein each RFID tag has an associated RFID tag identifier and is controllably switchable between a readable session state and an unreadable session state, the system comprising:
  a first wireless transmitter;
  a second wireless transmitter;
  a first circuit;
  a second circuit; and
  a control system that (1) determines a plurality of RFID tags of interest (TOIs) based on defined criteria and (2) communicates information about the RFID tag identifiers that are associated with the determined TOIs to the first circuit, wherein the defined criteria include one or more criteria that indicate an RFID tag is missing, wherein the missing RFID tag serves as a TOI;
  the first circuit for cooperating with the first wireless transmitter to generate and wirelessly transmit session control messages for reception by one or more of the RFID tags, wherein the session control messages are targeted to the determined TOIs based on the communicated information, and wherein the session control messages are operable to control whether the determined TOIs that receive the session control messages are in the readable session state or the unreadable session state;
  the second circuit for cooperating with the second wireless transmitter to generate and wirelessly transmit read request messages for reception by one or more of the RFID tags that are in the readable session state; and
  wherein the one or more criteria that indicate an RFID tag is missing comprises data which indicates that RFID tag has not been read in response to the read request messages within a defined time threshold, and wherein the defined time threshold is based on (1) an expected inventory turn time for an item linked with that RFID tag or (2) an expected intake turn time for the item linked with that RFID tag.

27. A method for controlling and communicating with a plurality of radio frequency identification (RFID) tags, wherein each RFID tag has an associated RFID tag identifier and is controllably switchable between a readable session state and an unreadable session state, the method comprising:
  determining which of the RFID tags qualify as tags of interest (TOIs) based on defined criteria, wherein the defined criteria include one or more criteria that indicate an RFID tag is missing, wherein the missing RFID tag serves as a TOI;
  generating session control messages for the determined TOIs;
  wirelessly transmitting the session control messages as first RF signals for reception by the determined TOIs, wherein the session control messages are targeted to the determined TOIs based on RFID tag identifier information for the determined TOIs, and wherein the session control messages are operable to control whether the determined TOIs that receive the session control messages are in the readable session state or the unreadable session state;
  generating read request messages; and
  wirelessly transmitting the read request messages as second RF signals for reception by one or more of the RFID tags that are in the readable session state; and
  wherein the first and second RF signals are wirelessly transmitted by different wireless transmitters; and
  wherein the one or more criteria that indicate an RFID tag is missing comprises data which indicates that RFID tag has not been read in response to the second RF signals within a defined time threshold, and wherein the defined time threshold is based on (1) an expected inventory turn time for an item linked with that RFID tag or (2) an expected intake turn time for the item linked with that RFID tag.

* * * * *